US006516442B1

(12) United States Patent
Wang et al.

(10) Patent No.: US 6,516,442 B1
(45) Date of Patent: Feb. 4, 2003

(54) CHANNEL INTERFACE AND PROTOCOLS FOR CACHE COHERENCY IN A SCALABLE SYMMETRIC MULTIPROCESSOR SYSTEM

(75) Inventors: Yuanlong Wang, San Jose, CA (US); Brian R. Biard, Alameda County, CA (US); Daniel Fu, Sunnyvale, CA (US); Earl T. Cohen, Fremont, CA (US); Carl G. Amdahl, Alameda County, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/281,749

(22) Filed: Mar. 30, 1999

Related U.S. Application Data

(63) Continuation-in-part of application No. 09/163,294, filed on Sep. 29, 1998, now Pat. No. 6,292,705, and a continuation-in-part of application No. 08/986,430, filed on Dec. 7, 1997, now Pat. No. 6,065,077.

(51) Int. Cl.[7] .................. H03M 13/00; G06C 13/00
(52) U.S. Cl. .................................. 714/776; 711/146
(58) Field of Search .................. 714/748, 18, 751, 714/20, 4, 776; 370/244, 235; 711/141, 146

(56) References Cited

U.S. PATENT DOCUMENTS

| 4,315,308 A | 2/1982 | Jackson |
| 4,438,494 A | 3/1984 | Budde et al. |
| 4,480,307 A | 10/1984 | Budde et al. |
| 5,161,156 A | * 11/1992 | Baum et al. .................. 714/4 |
| 5,271,000 A | * 12/1993 | Engbersen et al. ......... 370/244 |
| 5,313,609 A | 5/1994 | Baylor et al. |
| 5,335,335 A | 8/1994 | Jackson et al. |
| 5,440,698 A | 8/1995 | Sindhu et al. |
| 5,505,686 A | 4/1996 | Willis et al. |
| 5,511,226 A | 4/1996 | Zilka |
| 5,513,335 A | 4/1996 | McClure |
| 5,524,234 A | 6/1996 | Martinez, Jr. et al. |

(List continued on next page.)

OTHER PUBLICATIONS

Technical White Paper, Sun TM Enterprise TM 10000 Server, Sun Microsystems, Sep. 1998.

(List continued on next page.)

Primary Examiner—Albert Decady
Assistant Examiner—Cynthia Harris
(74) Attorney, Agent, or Firm—Keith Kind; Kelly H. Hale

(57) ABSTRACT

A preferred embodiment of a symmetric multiprocessor system includes a switched fabric (switch matrix) for data transfers that provides multiple concurrent buses that enable greatly increased bandwidth between processors and shared memory. A high-speed point-to-point Channel couples command initiators and memory with the switch matrix and with I/O subsystems. Each end of a channel is connected to a Channel Interface Block (CIB). The CIB presents a logical interface to the Channel, providing a communication path to and from a CIB in another IC. CIB logic presents a similar interface between the CIB and the core-logic and between the CIB and the Channel transceivers. A channel transport protocol is is implemented in the CIB to reliably transfer data from one chip to another in the face of errors and limited buffering.

44 Claims, 12 Drawing Sheets

U.S. PATENT DOCUMENTS

| | | | |
|---|---|---|---|
| 5,526,380 A | | 6/1996 | Izzard |
| 5,535,363 A | | 7/1996 | Prince |
| 5,537,569 A | | 7/1996 | Masubuchi |
| 5,537,575 A | | 7/1996 | Foley |
| 5,553,310 A | | 9/1996 | Taylor et al. |
| 5,561,779 A | | 10/1996 | Jackson |
| 5,568,620 A | | 10/1996 | Sarangdhar et al. |
| 5,574,868 A | | 11/1996 | Marisetty |
| 5,577,204 A | | 11/1996 | Brewer et al. |
| 5,581,729 A | | 12/1996 | Nishtala et al. |
| 5,588,131 A | | 12/1996 | Borrill |
| 5,594,886 A | | 1/1997 | Smith et al. |
| 5,602,814 A | * | 2/1997 | Jaquette et al. .......... 369/47.53 |
| 5,606,686 A | | 2/1997 | Tarui et al. |
| 5,634,043 A | | 5/1997 | Self et al. |
| 5,634,068 A | | 5/1997 | Nishtala et al. |
| 5,644,754 A | | 7/1997 | Weber |
| 5,655,100 A | | 8/1997 | Ebrahim et al. |
| 5,657,472 A | | 8/1997 | Van Loo et al. |
| 5,682,516 A | | 10/1997 | Sarangdhar et al. |
| 5,684,977 A | | 11/1997 | Van Loo et al. |
| 5,696,910 A | | 12/1997 | Pawlowski |
| 5,796,605 A | | 8/1998 | Hagersten |
| 5,829,034 A | | 10/1998 | Hagersten et al. |
| 5,895,495 A | | 4/1999 | Arimilli et al. |
| 5,897,656 A | | 4/1999 | Vogt et al. |
| 5,940,856 A | | 8/1999 | Arimilli et al. |
| 5,946,709 A | | 8/1999 | Arimilli et al. |
| 5,978,411 A | | 11/1999 | Kitade et al. |
| 6,044,122 A | | 3/2000 | Ellersick et al. |
| 6,065,077 A | | 5/2000 | Fu |
| 6,125,429 A | | 9/2000 | Goodwin et al. |
| 6,145,007 A | * | 11/2000 | Dokic et al. ................. 709/230 |
| 6,279,084 B1 | * | 8/2001 | VanDoren et al. .......... 711/141 |
| 6,289,420 B1 | | 9/2001 | Cypher |
| 6,292,705 B1 | | 9/2001 | Wang et al. |

OTHER PUBLICATIONS

Alan Charlesworth, Starfire: Extending the SMP Envelope, IEEE Micro, Jan./Feb. 1998, pp. 39–49.

Joseph Heinrich, Origin TM and Onyz2 TM Theory of Operations Manual, Document No. 007–3439–002, Silicon Graphics, Inc., 1997.

White Paper, Sequent's NUMA–Q SMP Architecture, Sequent, 1997.

White Paper, Eight–way Multiprocessing, Hewlett–Packard, Nov. 1997.

George White & Pete Vogt, Profusion, a Buffered, Cache–Coherent Crossbar Switch, presented at Hot Interconnects Symposium V, Aug. 1997.

Alan Charlesworth, et al., Gigaplane—XB: Extending the Ultra Enterprise Family, presented at Hot Interconnects Symposium V, Aug. 1997.

James Loudon & Daniel Lenoski, The SGI Origin: A ccNUMA Highly Scalable Server, Silcon Graphics, Inc., presented at the Proc. Of the $24^{th}$ Int'l Symp. Computer Architecture, Jun. 1997.

Mike Galles, Spider: A High–Speed Network Interconnect, IEEE Micro, Jan./Feb. 1997, pp. 34–39.

T.D. Lovett, R. M. Clapp and R. J. Safranek, NUMA–Q: an SCI–based Enterprise Server, Sequent, 1996.

Daniel E. Lenoski & Wolf–Dietrich Weber, Scalable Shared–Memory Multiprocessing, Morgan Kaufmann Publishers, 1995, pp. 143–159.

David B. Gustavson, The Scalable coherent Interface and Related Standards Projects, (as reprinted in Advanced Multimicroprocessor Bus Architectures, Janusz Zalewski, IEEE computer Society Press, 1995, pp. 195–207.).

Kevin Normoyle, et al., UltraSPARC TM Port Architecture, Sun Microsystems, Inc., presented in Hot Interconnects III, Aug. 1995.

Kevin Normoyle, et al., UltraSPARC TM Port Architecture, Sun Microsystems, Inc., presented in Hot Interconnects III, Aug. 1995, UltraSparc Interfaces.

Kai Hwang, Advanced Computer Architecture: Parallelism Scalability, Programmability, McGraw–Hill, 1993, pp. 355–357.

Jim Handy, The Cache Memory Book, Academic Press, 1993, pp. 161–169.

Angel L. Decegama, Parallel Processing Architectures and VLSI Hardware, vol. 1, Prentice–Hall, 1989, pp. 341–344.

* cited by examiner

CHANNEL INTERFACE AND PROTOCOLS FOR CACHE COHERENCY IN A SCALABLE SYMMETRIC MULTIPROCESSOR SYSTEM

CROSS-REFERENCE TO RELATED APPLICATIONS

This patent application is a continuation-in-part of the following commonly-owned, U.S. patent application Ser. Nos.:

U.S. application Ser. No. 08/986,430, filed Dec. 7, 1997 now U.S. Pat. No. 6,065,077; and U.S. application Ser. No. 09/163,294, filed Sep. 29, 1998 now U.S. Pat. No. 6,292,705;

all of which are incorporated by reference herein.

BACKGROUND

The system of FIG. 1 is a prototypical prior art symmetric multiprocessor (SMP) system 100. This traditional approach provides uniform access to memory 130 over a shared system bus 110. Each processor 120 has an associated cache and cache controller. The caches are individually managed according to a common cache coherency protocol to insure that all software is well behaved. The caches continually monitor (snoop) the shared system bus 110, watching for cache updates and other system transactions. Transactions are often decomposed into different component stages, controlled by different system bus signals, such that different stages of multiple transactions may be overlapped in time to permit greater throughput. Nevertheless, for each stage, subsequent transactions make sequential use of the shared bus. The serial availability of the bus insures that transactions are performed in a well-defined order. Without strong transaction ordering, cache coherency protocols fail and system and application software will not be well behaved.

A first problem with the above-described traditional SMP system is that the serial availability of the bus limits the scalability of the SMP system. As more processors are added, eventually system performance is limited by the saturation of the shared system bus.

What is needed is an SMP system architecture that provides greater scal ability by permitting concurrent use of multiple buses, while still providing a system serialization point to maintain strong transaction ordering and cache coherency. What is also needed is an SMP architecture that further provides increased transaction throughputs.

SUMMARY

A preferred embodiment of a symmetric multiprocessor system includes a switched fabric (switch matrix) for data transfers that provides multiple concurrent buses that enable greatly increased bandwidth between processors and shared memory. A high-speed point-to-point Channel couples command initiators and memory with the switch matrix and with I/O subsystems. Each end of a channel is connected to a Channel Interface Block (CIB). The CIB presents a logical interface to the Channel, providing a communication path to and from a CIB in another IC. CIB logic presents a similar interface between the CIB and the core-logic and between the CIB and the Channel transceivers. A channel transport protocol is is implemented in the CIB to reliably transfer data from one chip to another in the face of errors and limited buffering.

BRIEF DESCRIPTION OF DRAWINGS

FIG. 7a illustrates a minimal configuration, 7b illustrates a 4-way configuration, 7c illustrates an 8-way high-performance configuration, and 7d illustrates a configuration for I/O intensive applications.

DETAILED DESCRIPTION

System Overview

Figure 1:
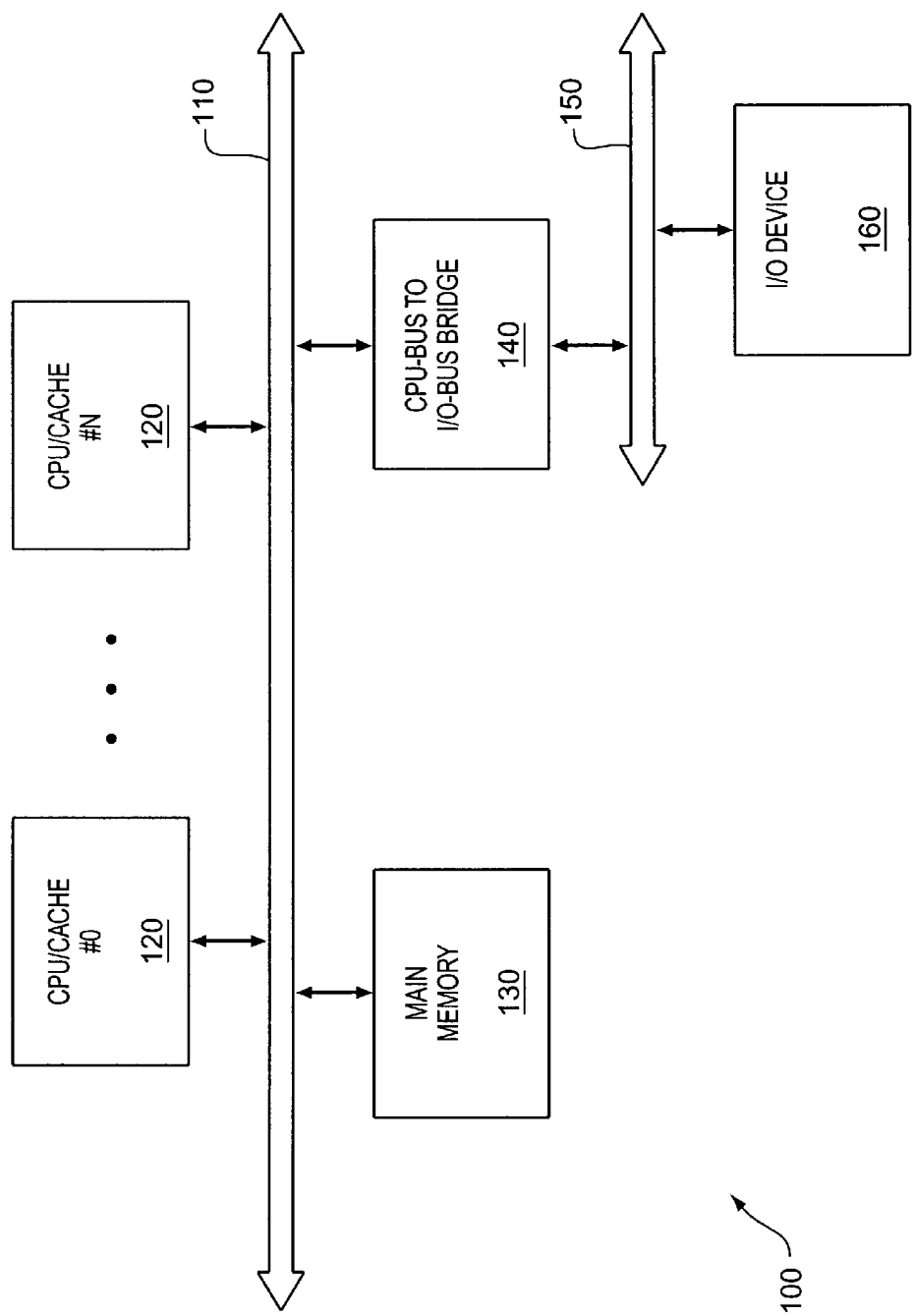
FIG. 1 is a drawing of a prior-art generic symmetric shared-memory multiprocessor system using a shared-bus.
Figure 2:
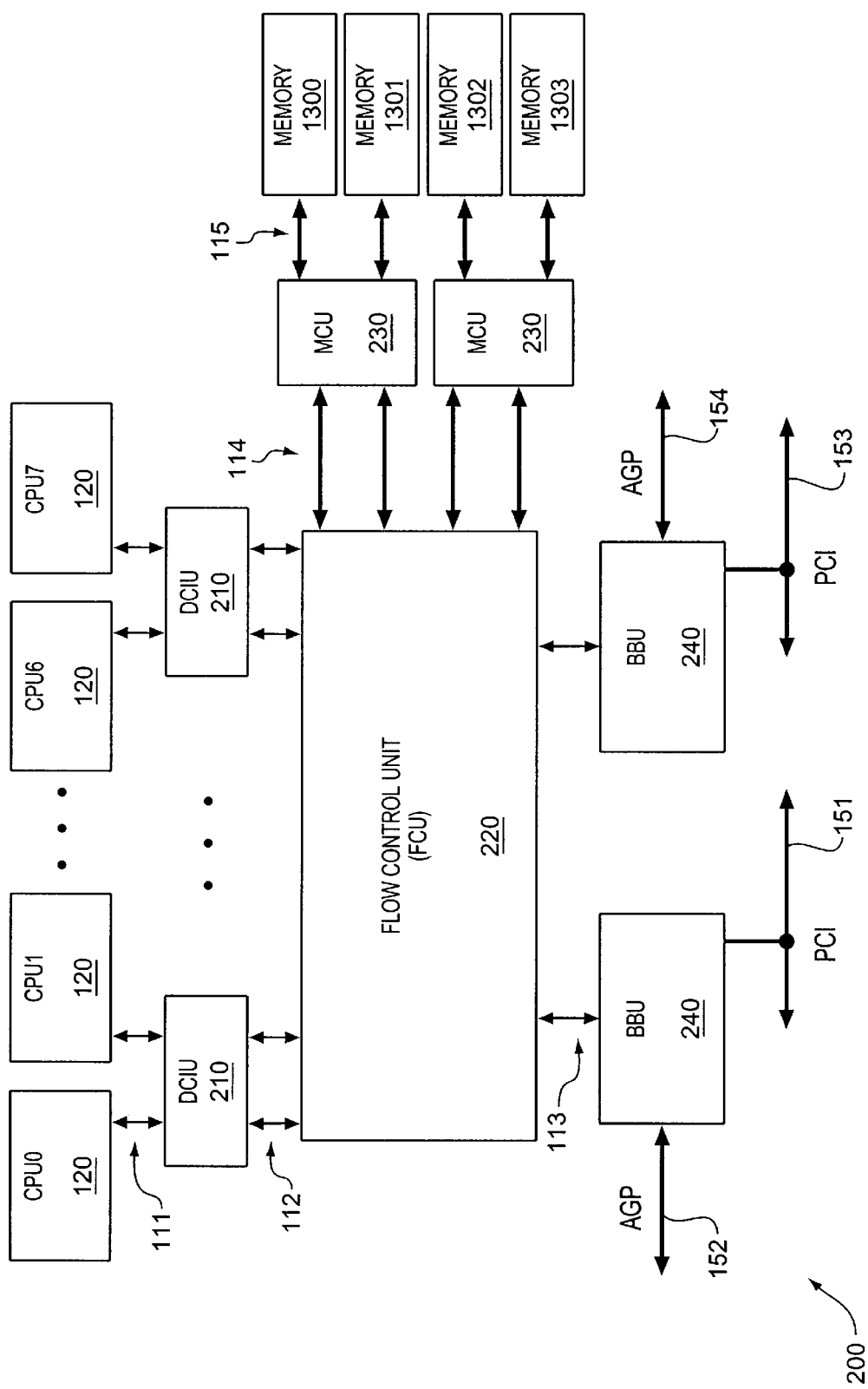
FIG. 2 is a drawing of a preferred embodiment symmetric shared-memory multiprocessor system using a switched fabric data path architecture centered on a Flow-Control Unit (FCU).

FIG. 2 is a drawing of a preferred embodiment symmetric shared-memory multiprocessor system using a switched fabric data path architecture centered on a Flow-Control Unit (FCU) 220. In the illustrated embodiment, eight processors 120 are used and the configuration is referred herein as an "8P" system.

The FCU (Flow Control Unit) 220 chip is the central core of the 8P system. The FCU internally implements a switched-fabric data path architecture. Point-to-Point (PP) interconnect 112, 113, and 114 and an associated protocol define dedicated communication channels for all FCU I/O. The terms Channels and PP-Channel are references to the FCU's PP I/O. The FCU provides Point-to-Point Channel interfaces to up to ten Bus Bridge Units (BBUs) 240 and/or CPU Channel Units (CCUS, also known as Chanel Interface Units or CIUs) and one to four Memory Control Units (MCUs) 230. Two of the ten Channels are fixed to connect to BBUs. The other eight Channels can connect to either BBUs or CCUs. In an illustrative embodiment the number of CCUs is eight. In one embodiment the CCUs are packaged as a pair referred herein as a Dual CPU Interface Unit (DCIU) 210. In the 8P system shown, the Dual CPU Interface Unit (DCIU) 210 interfaces two CPUs with the FCU. Throughout this description, a reference to a "CCU"

is understood to describe the logical operation of each half of a DCIU 210 and a references to "CCUs" is understood to apply to equally to an implementation that uses either single CCUs or DCIUs 210. CCUs act as a protocol converter between the CPU bus protocol and the PP-Channel protocol.

Figure 5:
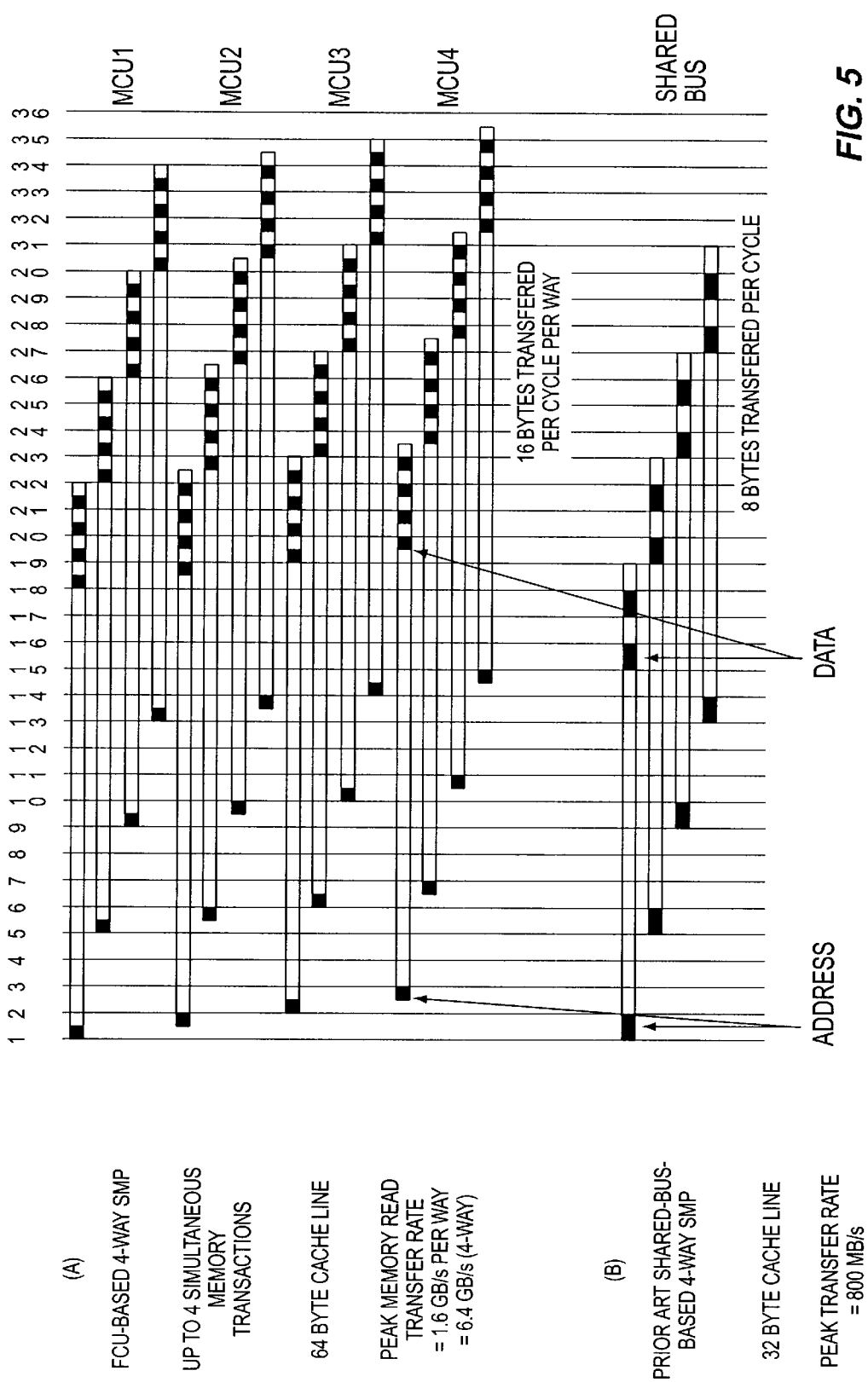
FIG. 5 is a timing diagram comparing the memory transaction performance of a system based on a flow control unit according to the present invention and a prior art shared-bus system.

The FCU 210 provides a high-bandwidth and low-latency connection among these components via a Data Switch, also referred herein as a Simultaneous Switched Matrix (SSM), or switched fabric data path. In addition to connecting all of these components, the FCU provides the cache coherency support for the connected BBUs and CCUs via a Transaction Controller and a set of cache-tags duplicating those of the attached CPUs' L2 caches. FIG. 5 is a timing diagram comparing the memory transaction performance of a system based on a flow control unit according to the present invention and a prior art shared-bus system.

In a preferred embodiment, the FCU provides support two dedicated BBU channels, four dedicated MCU channels, up to eight additional CCU or BBU channels, and PCI peer-to-peer bridging. The FCU contains a Transaction Controller (TC) with reflected L2 states. The TC supports up to 200M cache-coherent transactions/second, MOSEI and MESI protocols, and up to 39-bit addressing. The FCU contains the Simultaneous Switch Matrix (SSM) Dataflow Switch, which supports non-blocking data transfers.

In a preferred embodiment, the MCU supports flexible memory configurations, including one or two channels per MCU, up to 4 Gbytes per MCU (maximum of 16 Gbytes per system), with one or two memory banks per MCU, with one to four DIMMS per bank, of SDRAM, DDR-SDRAM, or RDRAM, and with non-interleaved or interleaved operation.

In a preferred embodiment, the BBU supports both 32 and 64 bit PCI bus configurations, including 32 bit/33 MHz, 32 bit/66 MHz, and 64 bit/66 MHz. The BBU is also 5 V tolerant and supports AGP.

All connections between components occur as a series of "transactions." A transaction is a Channel Protocol request command and a corresponding Channel Protocol reply. For example, via a CCU, can perform a Read request that will be forwarded, via the FCU, to the MCU; the MCU will return a Read reply, via the FCU, back to the same processor. A Transaction Protocol Table (TPT) defines the system-wide behavior of every type of transaction and a Point-to-Point Channel Protocol defines the command format for transactions.

The FCU assumes that initiators have converted addresses from other formats to conform with the PP-Channel definitions. The FCU does do target detection. Specifically, the FCU determines the correspondence between addresses and specific targets via address mapping tables. Note that this mapping hardware (contained in the CFGIF and the TC) maps from Channel Protocol addresses to targets. The mapping generally does not change or permute addresses.

Summary of Key Components

Transaction Controller (TC) 400. The most critical coherency principle obeyed by the FCU is the concept of a single, system-serialization point. The system-serialization point is the "funnel" through which all transactions must pass. By guaranteeing that all transactions pass through the system-serialization point, a precise order of transactions can be defined. (And this in turn implies a precise order of tag state changes.) In the FCU, the system-serialization point is the Transaction Controller (TC). Coherency state is maintained by the duplicate set of processor L2 cache-tags stored in the TC.

The Transaction Controller (TC) acts as central system-serialization and cache coherence point, ensuring that all transactions in the system happen in a defined order, obeying defined rules. All requests, cacheable or not, pass through the Transaction Controller. The TC handles the cache coherency protocol using a duplicate set of L2 cache-tags for each CPU. It also controls address mapping inside the FCU, dispatching each transaction request to the appropriate target interface.

Transaction Bus (TB) 3104 and Transaction Status Bus (TSB) 3106. All request commands flow through the Transaction Bus. The Transaction Bus is designed to provide fair arbitration between all transaction sources (initiators) and the TC; it provides an inbound path to the TC, and distributes outbound status from the TC (via a Transaction Status Bus).

The Transaction Bus (TB) is the address/control "highway" in the FCU. It includes an arbiter and the Transaction Bus itself. The TB pipelines the address over two cycles. The extent of pipelining is intended to support operation of the FCU at 200 Mhz using contemporary fabrication technology at the time of filing of this disclosure.

Whereas the TB provides inputs to the Transaction Controller, the Transaction Status Bus delivers outputs from the Transaction Controller to each interface and/or target. The TSB outputs provide transaction confirmation, coherency state update information, etc. Note that while many signals on the TSB are common, the TC does drive unique status information (such as cache-state) to each interface. The Transaction Bus and Transaction Status Bus are discussed in detail later in this application.

Switched Fabric Data Path (Data Switch). The Data Switch is an implementation of a Simultaneous Switched Matrix (SSM) or switched fabric data path architecture. It provides for parallel routing of transaction data between multiple initiators and multiple targets. The Data Switch is designed to let multiple, simultaneous data transfers take place to/from initiators and from/to targets (destinations of transactions). Note that the Data Switch is packet based. Every transfer over the Data Switch starts with a Channel Protocol command (playing the role of a packet header) and is followed by zero or more data cycles (the packet payload). All reply commands (some with data) flow through the Data Switch. Both write requests and read replies will have data cycles. Other replies also use the Data Switch and will only send a command header (no payload).

IIF (Initiator InterFace) 3102. The IIF is the interface between the FCU and an initiator (a BBU or a CCU). The EIF transfers Channel Protocol commands to and from the initiator. The IIF must understand the cache coherency protocol and must be able to track all outstanding transactions. Note that the BBU/CCU can be both an initiator of commands and a target of commands (for CSR read/write if nothing else). Address and control buffering happen in the IIF; bulk data buffering is preferably done in the BBU/CCU (in order to save space in the FCU, which has ten copies of the IIF). The IIF needs configuration for CPU and I/O modes, and to handle differences between multiple types of processors that may be used in different system configurations.

Memory Interface (MIF) 3108. The Memory Interface (MIF) is the portal to the memory system, acting as the interface between the rest of the chipset and the MCU(s). The MIF is the interpreter/filter/parser that receives transaction status from the TB and TC, issues requests to the MCU, receives replies from the MCU, and forwards the replies to the initiator of the transaction via the Data Switch. It is a "slave" device in that it can never be an initiator on the TB. (The MIF is an initiator in another sense, in that it sources data to the Data Switch.) For higher performance, the MIF supports speculative reads. Speculative reads start the read process early using the data from the TB rather than waiting for the data on the TSB. There is one MIF (regardless of how many memory interfaces there are). The MIF contains the memory mapping logic that determines the relationship between addresses and MCUs (and memory ports). The memory mapping logic includes means to configure the MIF for various memory banking/interleaving schemes. The MWF also contains the GART (Graphics Address Remap Table). Addresses that hit in the GART region of memory will be mapped by the GART to the proper physical address.

Configuration Register Interface (CFGIF) 410. This is where all the FCU's Control and Status Registers (CSRs) logically reside. CFGIF is responsible for the reading and writing of all the CSRs in the FCU, as well as all of the diagnostic reads/writes (e.g., diagnostic accesses to the duplicate tag RAM).

Channel Interface Block (CIB). The CIBs are the transmit and receive interface for the Channel connections to and from the FCU. The FCU has 14 copies of the CIB, 10 for BBUs/CCUs, and 4 for MCUs. (The CIB is generic, but the logic on the core-side of the Channel is an IIF or the MIF.)

Figure 3:
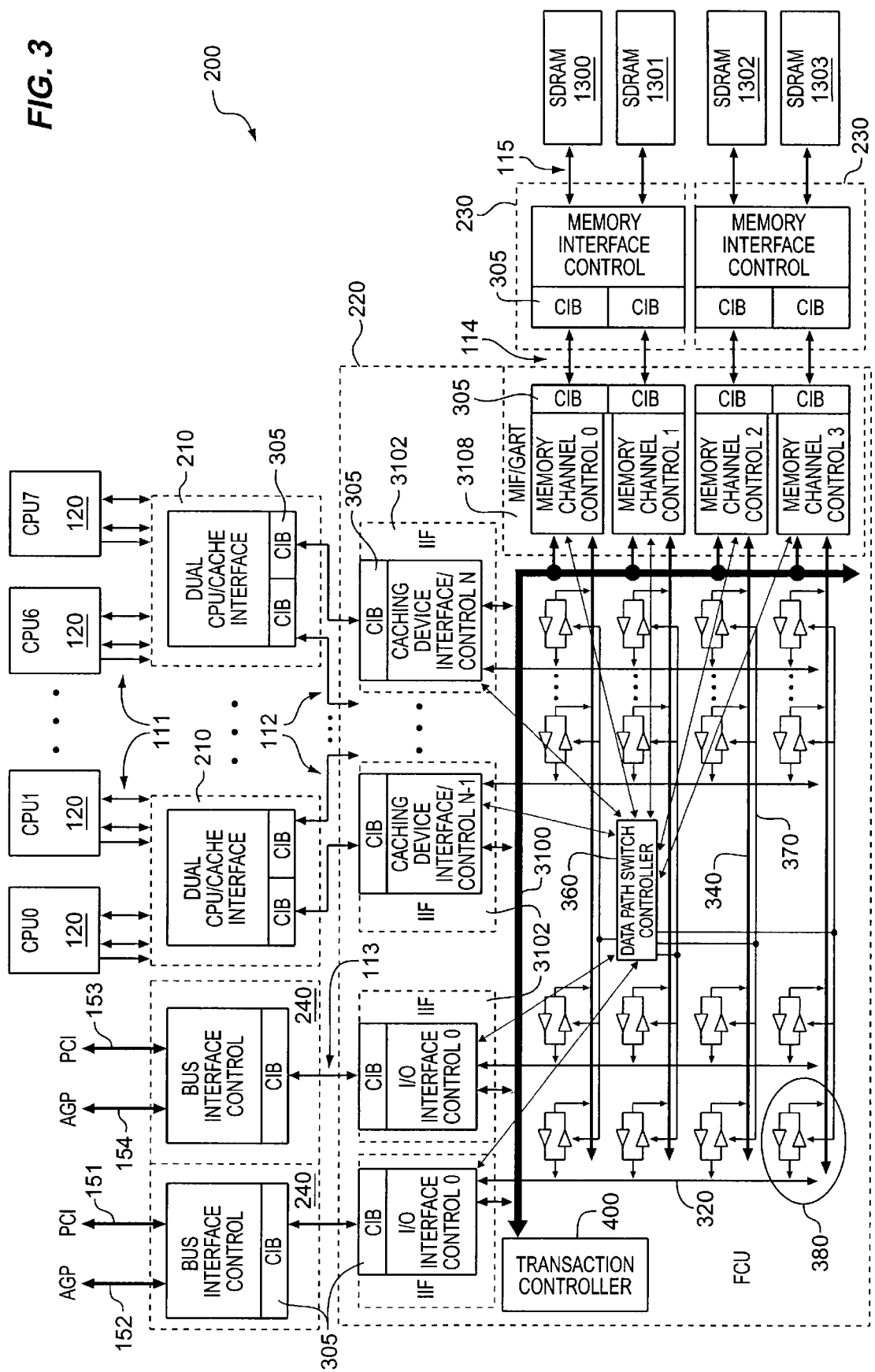
FIG. 3 is a drawing of the switched fabric data path architecture of FIG. 2, further showing internal detail of an FCU having a Transaction Controller (TC), Transaction Bus (TB), and Transaction Status Bus (TSB) according to the present invention.

Embodiments overview. FIG. 3 is a drawing showing internal detail of the switched fabric data path architecture within the FCU of FIG. 2. A first key component of the FCU is the Transaction Controller (TC) 400. A second key component of the FCU is an address and control bus 3100, that is actually an abstraction representing a Transaction Bus (TB) 3104 and Transaction Status Bus (TSB) 3106. A third key component of the FCU is the Data Path Switch (also referred herein as the Data Switch, or the switched fabric data path). The Data Switch is composed of vertical buses 320, horizontal buses 340, node switches 380. The node switches selectively couple the vertical and horizontal buses under control of the Data Path Switch Controller 360 and control signals 370. Additional key components of the FCU include one or more Initiator Interfaces (IIFs) 3102; a Memory Interface (MIF) 3108; and Channel Interface Blocks (CIBs) 305 at the periphery of the various interfaces.

Figure 4:
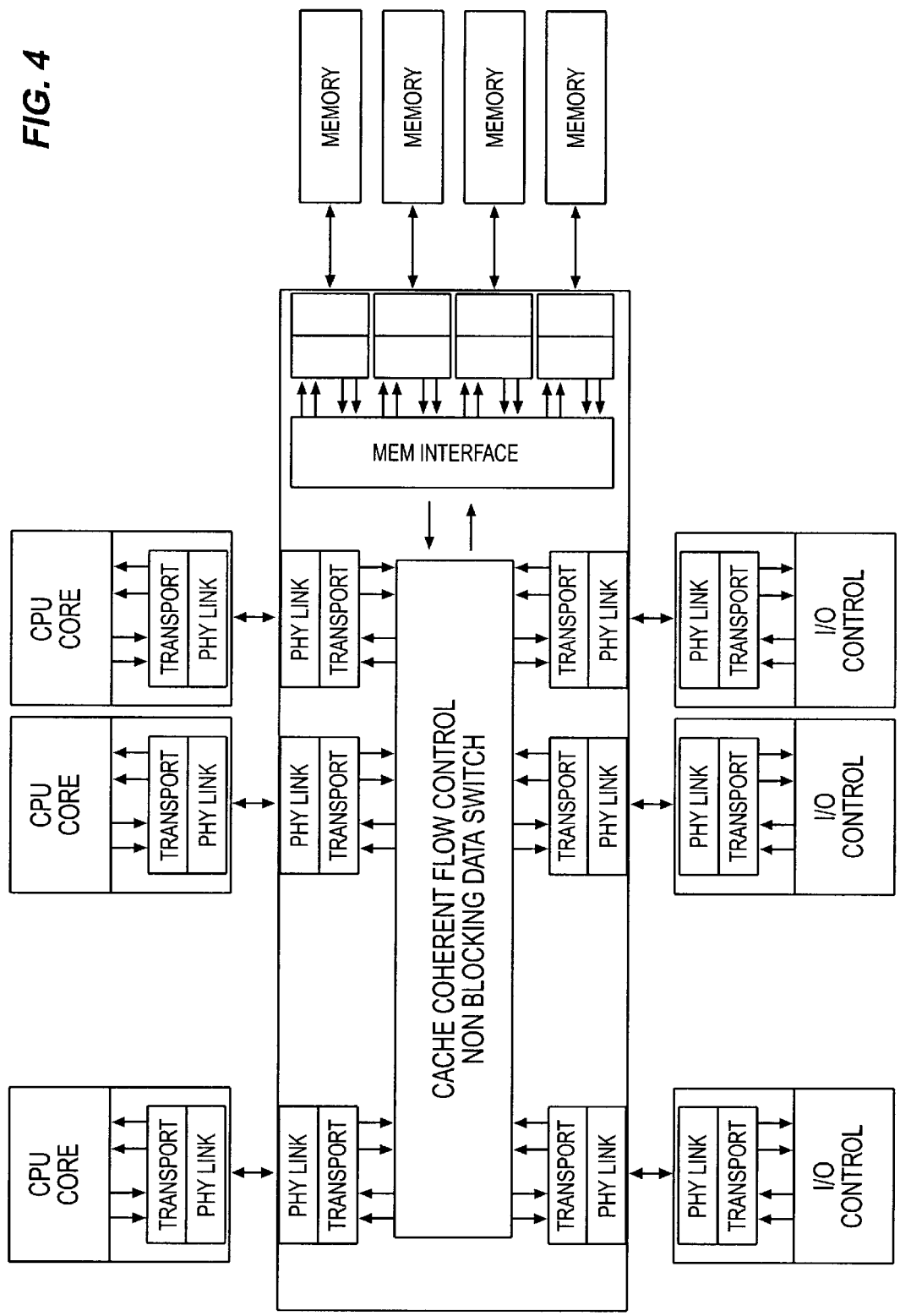
FIG. 4 is a drawing of a variation on the embodiment of FIG. 2, in which each CPU has its own CCU, and in which the channel interface and control is abstractly represented as being composed of a physical (PHY) link layer and a transport layer.
Figure 6:
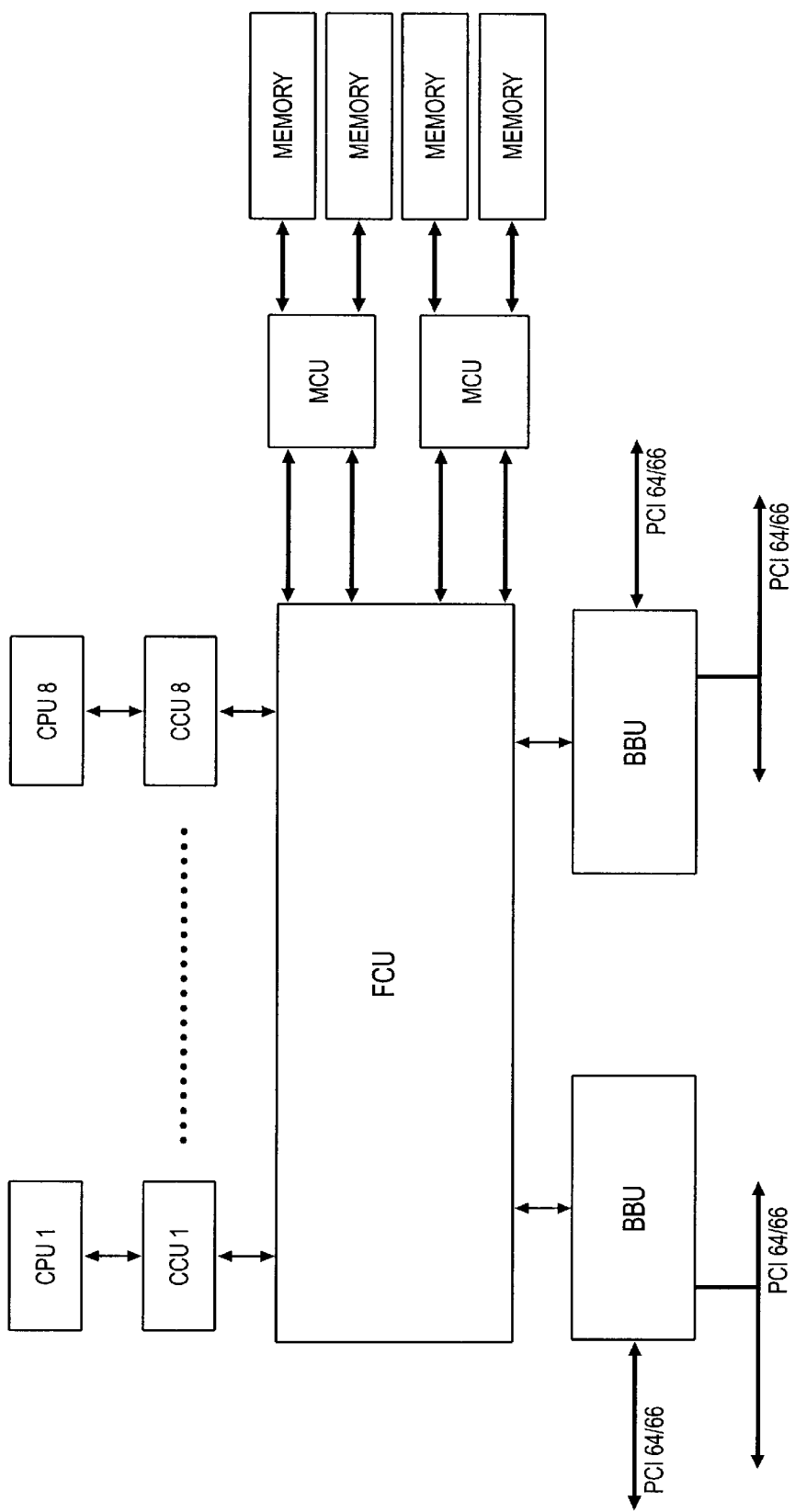
FIG. 6 is another view of the embodiment of FIG. 4.
Figure 7:
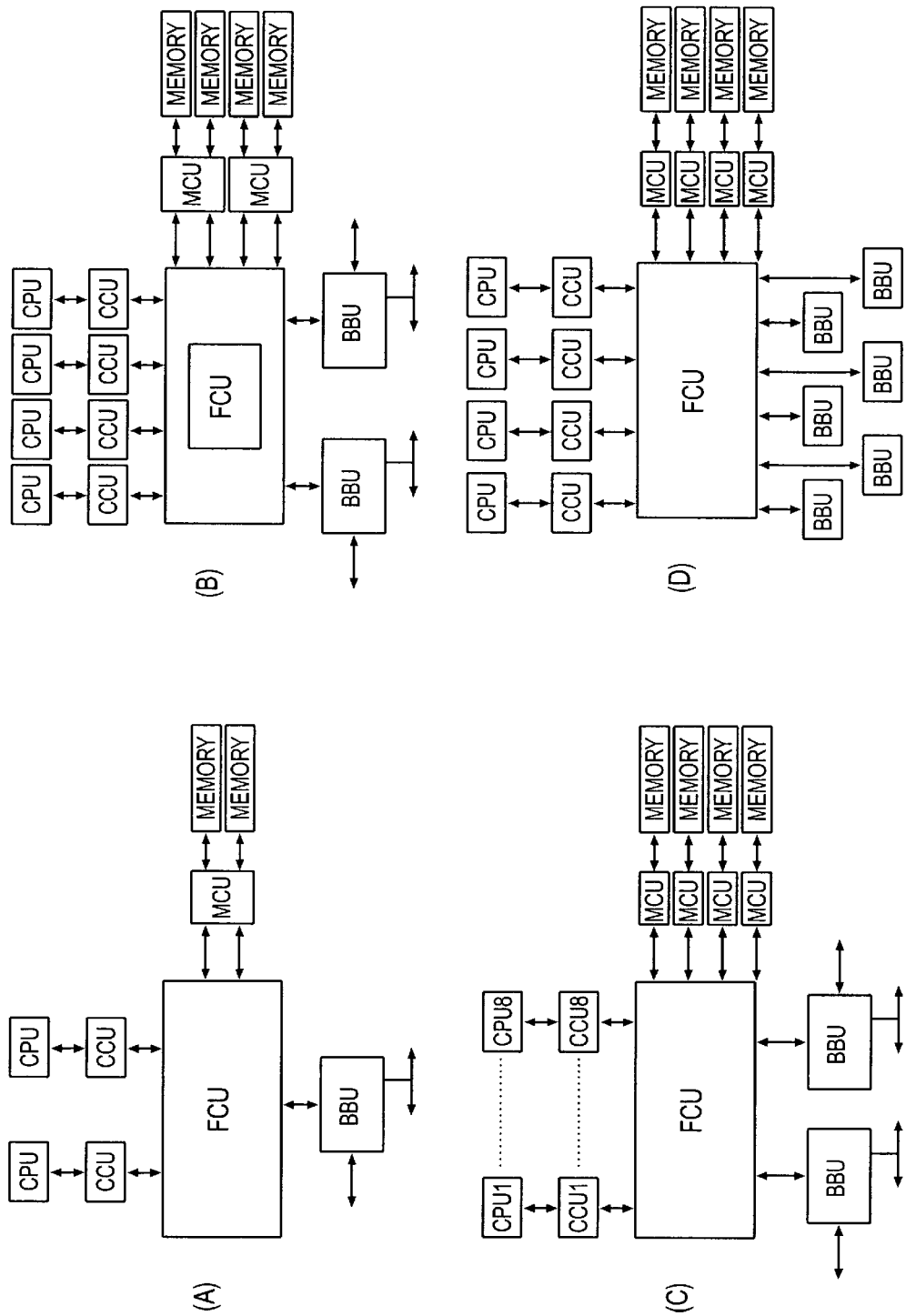
FIG. 7 is a drawing of a number of system embodiments according to the present invention.

A number of alternate embodiments exist. FIG. 4 is a drawing of a variation on the embodiment of FIG. 2, in which each CPU has its own CCU. In this view the channel interface and control that make up the IIFs and CCUs are abstractly represented as being composed of a physical (PHY) link layer and a transport layer. FIG. 6 is another view of the embodiment of FIG. 4. FIG. 7 is a drawing of a number of application specific variations on the embodiment of FIG. 4. FIG. 7a illustrates a minimal configuration, 7b illustrates a 4-way configuration, 7c illustrates an 8-way high-performance configuration, and 7d illustrates a configuration for I/O intensive applications.

Figure 8:
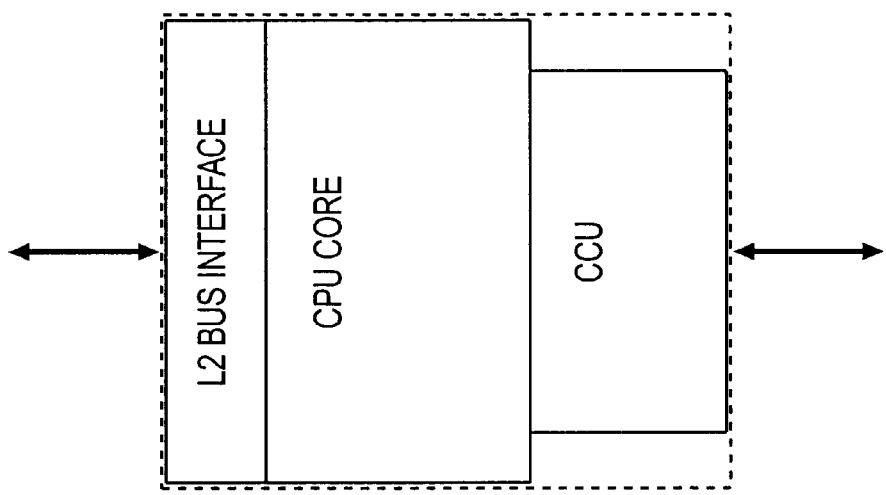
FIG. 8 is a drawing of a CPU having an integral CCU.
Figure 9:
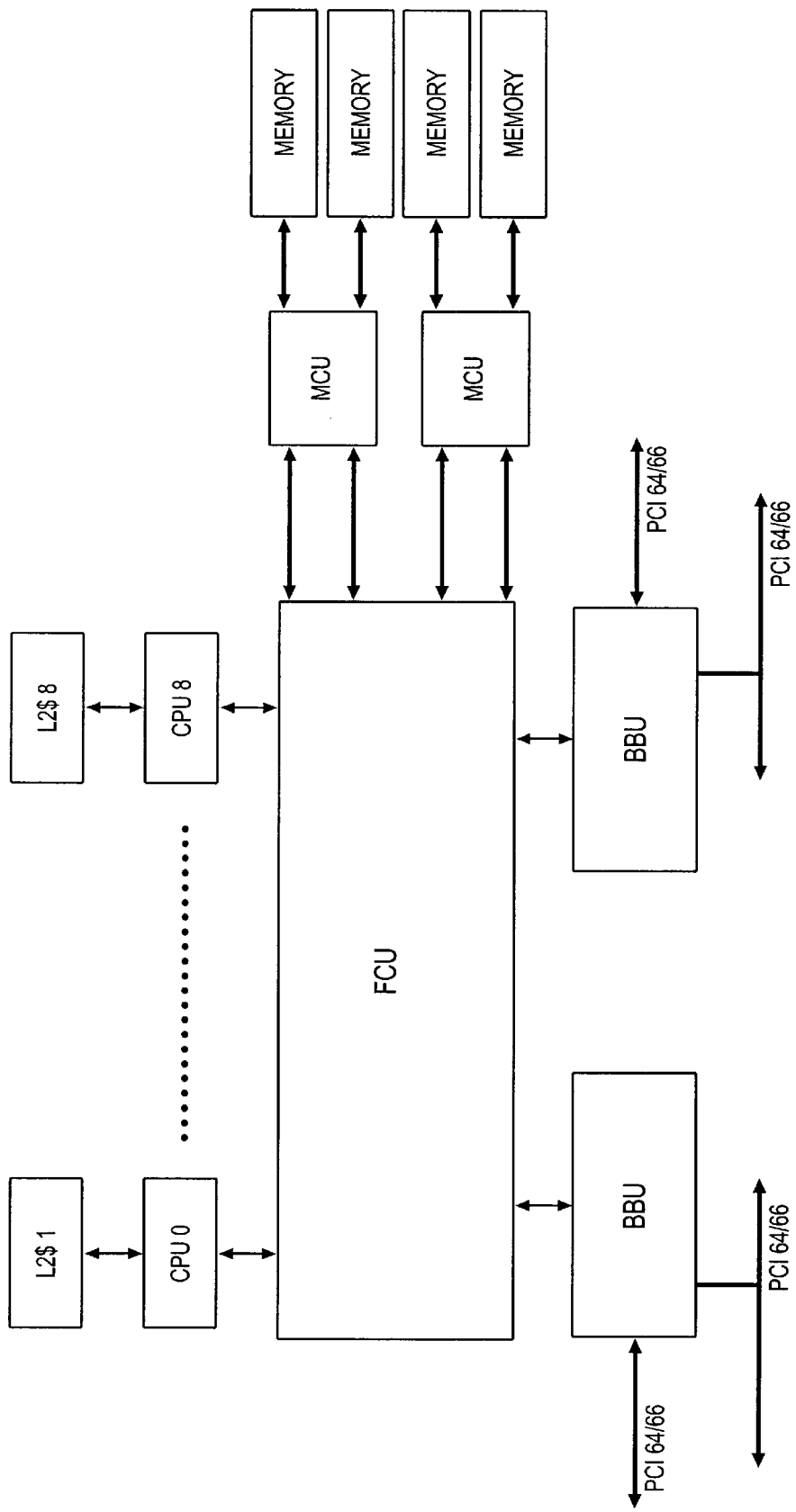
FIG. 9 illustrates a variation of the embodiment of FIG. 6 using the integrated CPU/CCU of FIG. 8.
Figure 10:
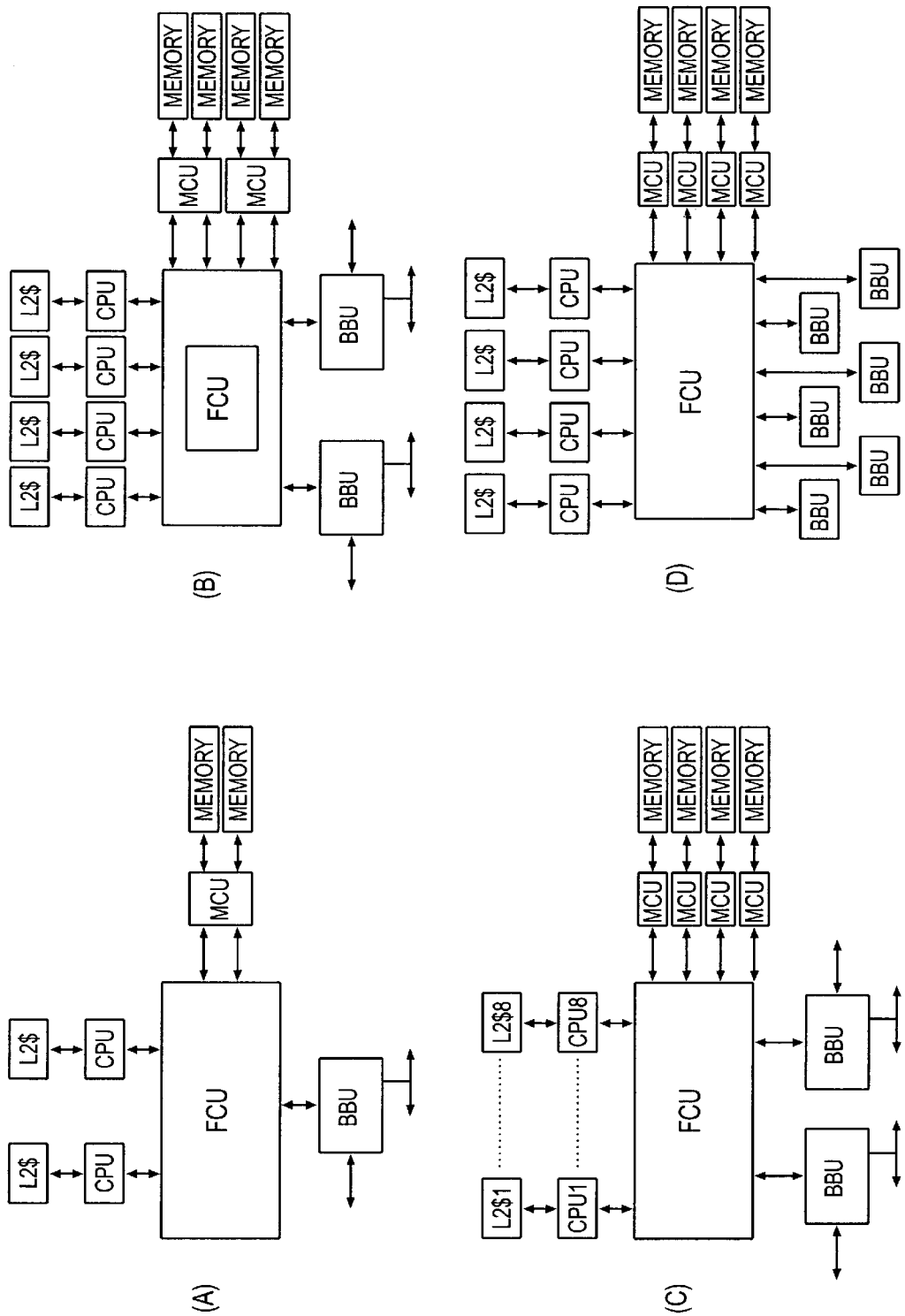
FIG. 10 illustrates variations of the embodiments of FIG. 7 using the integrated CPU/CCU of FIG. 8.

FIG. 8 is a drawing of a CPU having an integral CCU. FIG. 8 makes explicit a "backside" bus interface to an external cache (an L2 cache in the case illustrated). An IIF replaces the conventional CPU interface, such that the Channel is the frontside bus of the CPU of FIG. 8. The embodiments of FIGS. 9 and 10, are respective variations of the embodiments of FIGS. 6 and 7, with adaptation for the use of the integrated CPU/CCU of FIG. 8. The embodiments of FIGS. 9 and 10 offer system solutions with lower CPU pin counts, higher throughput, lower latency, hot plugable CPUs (if an OS supports it), and reduced PCB board layout complexity compared with non-integrated solutions.

Figure 11:
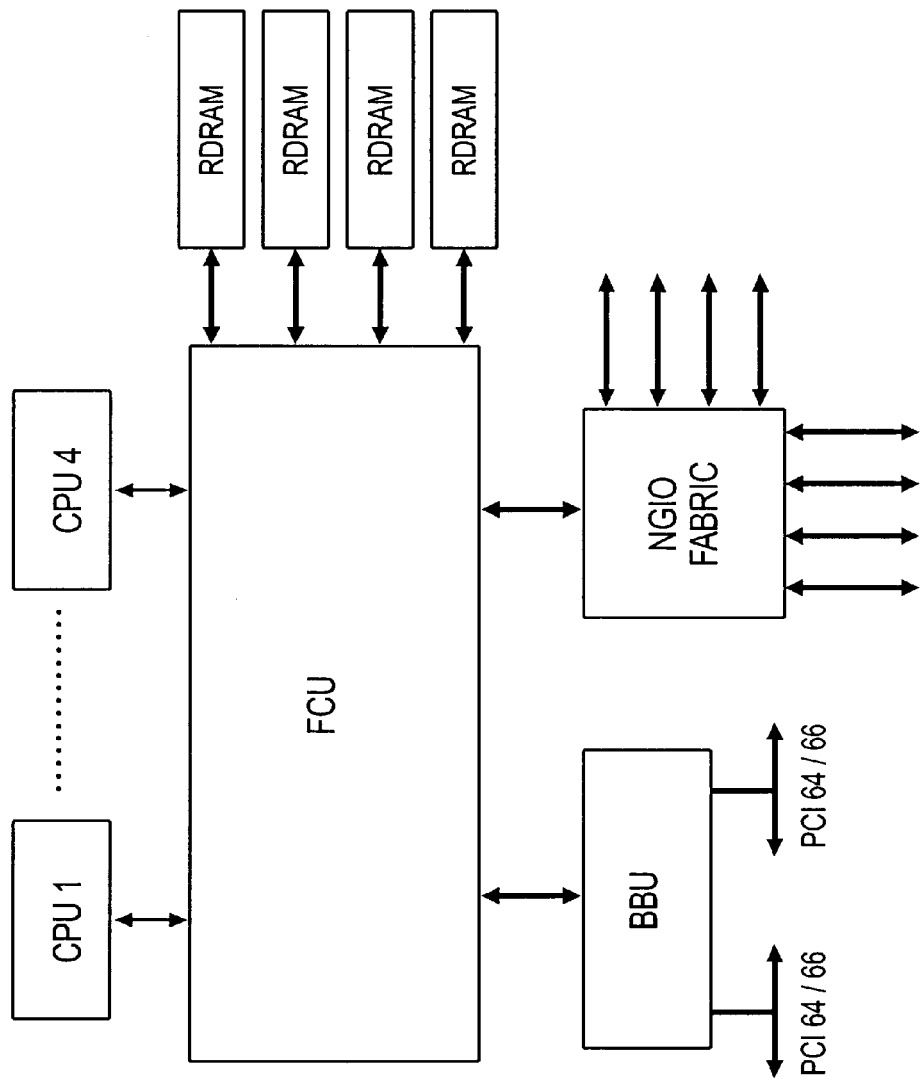
FIG. 11 is a drawing of an 4-way embodiment of the present invention that includes coupling to an industry standard switching fabric for coupling CPU/Memory complexes with I/O devices.
Figure 12:
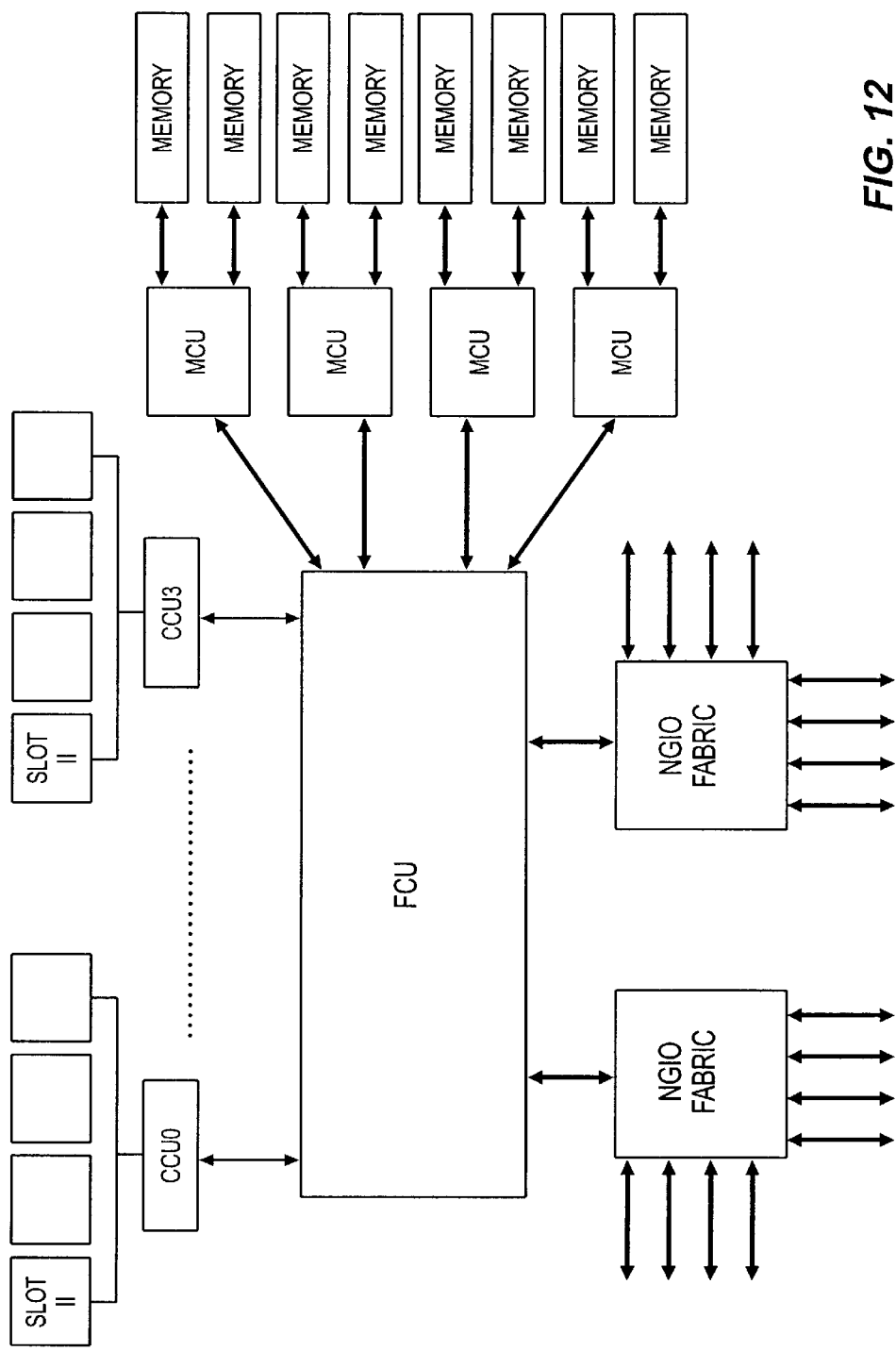
FIG. 12 is a drawing of a 16-way embodiment of the present invention, in which multiple 4-way shared-bus systems are coupled via CCUs to the FCU, and which includes coupling to two instances of an industry standard switching fabric for coupling CPU/Memory complexes with I/O devices.

FIG. 11 is a drawing of an 4-way embodiment of the present invention that includes coupling to an industry standard switching fabric for coupling CPU/Memory complexes with I/O devices. FIG. 12 is a drawing of a 16-way embodiment of the present invention, in which multiple 4-way shared-bus systems are coupled via CCUs to the FCU, and which includes coupling to two instances of an industry standard switching fabric for coupling CPU/Memory complexes with I/O devices.

Additional Descriptions

U.S. application Ser. No. 08/986,430, AN APPARATUS AND METHOD FOR A CACHE COHERENT SHARED MEMORY MULTIPROCESSING SYSTEM, filed Dec. 7, 1997, incorporated by reference above, provides additional detail of the overall operation of the systems of FIGS. 2 and 3. U.S. application Ser. No. 09/163,294, METHOD AND APPARATUS FOR ADDRESS TRANSFERS, SYSTEM SERIALIZATION, AND CENTRALIZED CACHE AND TRANSACTION CONTROL, IN A SYMMETRIC MULTIPROCESSOR SYSTEM, filed Sep. 29, 1998, incorporated by reference above, provides additional detail of particular transaction address bus embodiments. U.S. application Ser. No. 09/168,311, METHOD AN APPARATUS FOR EXTRACTING RECEIVED DIGITAL DATA FROM A FULL-DUPLEX POINT-TO-POINT SIGNALING CHANNEL USING SAMPLED DATA TECHNIQUES, filed Oct. 7, 1998, provides additional detail of particular transceiver embodiments, and is incorporated by reference herein. U.S. application Ser. No. 09/192,181, COMPACT MODULAR MULTI-PROCESSING ASSEMBLY WITH EFFICIENT PROCESSOR COOLING, filed Nov. 15, 1998, provides additional detail of particular multiprocessor assembly embodiments, and is incorporated by reference herein. To the extent to which any discrepancies exist between the descriptions in the above referenced applications and the instant application, the instant application should take priority in resolving such discrepancies as it provides architectural improvements and preferred embodiments not known at the time of the filing of the earlier applications.

Channel Overview and Terminology

The Channel of the present invention is a general-purpose, high-speed, point-to-point, full-duplex, bi-directional interconnect bus suitable for use in a broad range of applications including computer memory, I/O, CPU, switching/routing, or any other application where high bandwidth and low latency is required. The use of full-duplex, bi-directional signaling technology permits 1.6 GBps transfer rates simultaneously in each direction (3.2 GBps total throughput), using conventional system and board design technologies, and using only 25 signal pins. The CIB presents a simple, logical interface to a Channel, providing a communication path (a Channel) to and from a CIB in another IC.

A "packet" is the basic unit of transport over the Channel. In a preferred embodiment, conceptually a packet is a single 80-bit frame (information unit) exchanged between CIBs, the frame including:

64 bits of data exchanged core-to-core;

2 bits of control information exchanged core-to-core;

6 bits of control information exchanged CIB-to-CIB; and 8 bits of ECC exchanged CIB-to-CIB.

The 2 bits of control information from the core and the 6 bits of control information added by the CIB are encoded in to a single, 8-bit control field.

Each packet is sent across the CIB/transceiver interface in two phases of 40-bits each. Each packet is exchanged between CIB transceivers via a physical interconnect, which has 25 wires, including 16 wires dedicated to bi-directional core-to-core data and 4 wires dedicated to bi-directional core-to-core control information. Quad-Data-Rate (QDR) signaling is used to transmit and receive the 16-bit data and 4-bit control information four times, to effect the transfer of the full 80-bit packet within each 200 MHz clock.

The core-to-core data and control information is sent across the CIB/core interface along with additional signaling that is meaningful only to CIB/core interactions. The CIB-to-CIB signals are not sent across the CIB/core interface. In the context of the CIB/core interface, the term packet is used to refer to just the core-to-core data and control-information. Other than in conjunction with the CIB/core interface, the core-to-core control-information is not used within the core. In the context of the core functions, the term packet is used to refer to just the core-to-core data. The core-to-core data is the information unit primitive upon which transactions (discussed next) are built. Thus, the particular connotation for the term packet must be determined from the context in which it is used.

A "transaction" is a concept in the higher-level protocol sent over the Channel by the core logic. A transaction consists of a command header and zero or more data cycles. From the CIB's perspective, transactions are irrelevant—the CIB just guarantees to deliver packets reliably, and the core logic adds any interpretation that forms multiple packets in to transactions. Note that the core logic cannot expect packets within a transaction to arrive contiguously—due to retries, there may be any number of IDLE cycles inserted at any point. In networking terms, the transceivers provide the physical layer (L1), the CIB logic provides the link-level layer (L2), and the core logic provides the transaction-level layer (L3). Each layer only has to know about the layers on either side, not about all layers in the stack.

A "master" IC is one which generates its own clock; a "slave" IC is one which receives a clock from the master (via the Channel).

Channel Interface Block

The Channel Interface Block (CIB) is a common block used in all the ICs in the 8P FCU-based chipset. The CIB presents a simple, logical interface to a Channel, providing a communication path (a Channel) to and from a CIB in another IC. From the IC core logic's point-of-view, the CIB acts as a pair of FIFOs with a non-zero (and variable) fall-through time which connect this IC to another. The CIB performs no interpretation of the data provided by the core logic—the higher-level (transaction-level) protocols used by the core logic are transparent to the CIB.

The CIB is divided into two parts: the "CIB logic", and the transceivers. The CIB logic refers to the part of the CIB that forms the interface between the core logic in the IC and the Channel transceivers. In a preferred embodiment, the CIB logic and the transceivers are treated as a single top-level block in ICs.

CIB Signal Interface. The CIB interfaces to the core logic in the IC using a simple, generic interface that is frequency and bandwidth independent. This interface is common, no matter what CIB or transceiver design is used. The CIB has an internal interface to the transceivers; while this interface is not externally visible, it is important to define it here because much of the CIB logic's design is dependent upon this interface. The transceiver interface is discussed first because some signals just "pass through" to other parts of the IC. The CIB interface to the core logic is designed to be synchronous using the core logic clock—from the core logic's perspective, the CIB is just another top-level logic block communicating via flip-flops on the core logic clock. The nature of the Channel is such that some asynchronous interfaces are necessary; these asynchronous interfaces are "hidden" inside the transceivers—the interface between the CIB logic and the transceivers is also synchronous on the core logic clock. This clean division allows issues with clock domains, clock skew, race conditions, etc., to be handled in a confined area (the transceivers) where the place and route variations can be minimized.

Nomenclature for signal tables. In the signal tables to follow, signals marked with an asterisk are "pass through" and are I/O pins of the CIB (and are not used in the CIB). Signals marked with a '+' are signals that pass through (possibly with a name change) which are also used inside the CIB.

Signals in the CIB to Transceiver Interface (CIB-internal)

Clocks:

| Signal name | Definition |
| --- | --- |
| * clk | the core clock (used to sample transmitted data, to synchronize received data, etc.) |
| * tr_clk | clock output to clock block (slave ICs) |

CIB to Transceivers Datapath:

| Signal name | Definition |
| --- | --- |
| tr_t_data_p0[79:40] | the first half of the packet to be transmitted |
| tr_t_data_p2[39:0] | the second half of the packet to be transmitted |
| * tr_test_mode | test-mode enable; when active, allows transceiver I/Os to be used as test I/Os |
| * tr_t_test_data[19:0] | test data to be drive in test mode |
| * tr_pscan_data[19:0] | parallel scan data for core scan mode |
| * tr_t_en | tri-state enable for transmitted test OR parallel scan data (active means transmit; inactive means receive) |
| + power_on_reset | power-on reset from clock control block |
| * pll_lock | indication that the PLL is locked and is stable and can be used |

Transceivers to CIB datapath:

| Signal name | Definition |
| --- | --- |
| tr_r_data[79:0] | the received packet |
| * tr_r_test_data[19:0] | received test OR parallel scan data |

CIB to transceivers control:

| Signal name | Definition |
| --- | --- |
| + tr_master | active indicates this is a master IC |
| + tr_half_speed | run the Channel I/Os at half-speed |
| tr_clk_en_in | clock enable for transmitted packets; used to run at half speed |
| tr_phase_adjust_grant | grant of request to adjust clock phase |
| tr_force_recalibration | force Channel to recalibrate itself |

Transceivers to CIB control:

| Signal name | Definition |
| --- | --- |
| tr_clk_en_out | clock enable for received packets; used to run at half speed |
| + tr_t_dll_locked | status output: transmitter DLL lock achieved |
| + tr_r_dll_locked | status output: receiver DLL lock achieved |
| + tr_drvr_calibrated | status output: drivers calibrated |
| tr_phase_adjust_needed | request to adjust clock phase |

Transceiver JTAG interface:

| Signal name | Definition |
| --- | --- |
| * tr_jtag_bs_en | JTAG boundary scan enable |
| * tr_jtag_pscan_en | JTAG parallel scan enable |
| * tr_jtag_tdi | JTAG (boundary) scan in |
| * tr_jtag_tdo | JTAG (boundary) scan out |
| * tr_jtag_clk | JTAG scan clk |
| * tr_jtag_capture | JTAG clk enable for capture |
| * tr_jtag_load | JTAG clk enable for load |

Transceiver external I/Os:

| Signal name | Definition |
| --- | --- |
| * PP_data[15:0] | 16 full-duplex, bi-directional data wires |
| * PP_ctl[3:0] | 4 full-duplex, bi-directional control wires |
| * PP_clkout | forwarded output clock with transmitted data |
| * PP_clkin | forwarded input clock with received data |
| * PP_ref[1:0] | high and low voltage reference lines |
| * PP_cal | Channel calibration trace |

The "normal" interface between the CIB and the transceivers is very simple—tr_t_data_p0/tr_t_data_p2 and tr_r_data are the 80-bit datapath to and from the Channel. The clk signal is the core clock, and both tr_t_data_p0/tr_t_data_p2 and tr_r_data are synchronous with this clock. But, tr_t_data_p2 (providing the second half of the data packet to be transmitted) is (less than) one half clock cycle late! This feature is used to allow ECC to be computed and sent "on-the-fly" after the data is already in progress.

The power_on_reset and pll_lock inputs to the transceivers control the wake-up sequencing that synchronizes the two ends of the Channel.

In "test mode" (when tr_t_en is asserted), the 20 external Channel I/O pins (PP_data and PP_ctl) are available for use as a "test bus". (PP_ctl forms bits 19:16 of the test bus; PP_data forms bits 15:0.) This bus can be driven directly by tr_t_test_data or tr_pscan_data (as controlled by tr_jtag_pscan_en) and can be received by tr_r_test_data; the enable signal tr_t_en controls whether this bus drives or receives. Note that some transceiver designs require a clock in order to function as a receiver.

There are various control and status signals to and from the transceivers. The major mode controls to the transceivers are tr_master, tr_half_speed, and tr_clk_en_in. tr_master indicates that the IC is a "master" (a clock source), and tr_half_speed indicates that the transceivers are sending (and receiving) data at half of the core clock rate. tr_clk_en_in is used to control which core clock edge provides data to the transceivers. tr_clk_en_out from the transceivers is the corresponding output clock enable which controls when data from the transceivers is present. (When not running at half speed, both tr_clk_en_in and tr_clk_en_out should always be asserted.)

The Channel is ready (the CIB logic can begin to send data) when the following is true:

tr_t_dll_locked && tr_r_dll_locked && tr_drvr_calibrated

The transceivers may determine that the clock has drifted and a clock phase adjustment is needed; this is requested with the tr_phase_adjust_needed signal and granted with the tr_phase_adjust_grant signal. tr_phase_adjust_grant should be asserted for at least 32 cycles. The Channel should not be used by the CIB logic during the cycles when tr_phase_adjust_grant is asserted; the CIB logic should send IDLE cycles during this period. (Note that this definition of the Channel being ready refers to the transceivers being ready and is not necessarily the same as the CIB as a whole being ready to accept data from the core logic.)

If the CIB logic determines it has too high an error rate, it can request that the transceiver logic resynchronize the Channel with the tr_force_recalibration signal. The Channel is not usable during recalibration; the CIB logic should send IDLE cycles to the transceivers, and should assert backoff (ch_t_backoff) to the core logic, during this period. When recalibration starts, tr_drvr_calibrated is deasserted by the transceivers; the Channel is again ready for use when tr_drvr_calibrated is re-asserted. (tr_force_recalibration should be asserted until tr_drvr_calibrated is de-asserted; this forms a positive handshake with the transceivers.) The CIB logic should detect a "timeout" if the recalibration procedure takes longer than a predetermined interval.

The various JTAG scan modes, tr_jtag_bs_en and tr_jtag_pscan_en, over-ride all other modes and control scan operations of the transceiver circuitry.

Signals in the Core Logic to CIB Interface

The signals between the core logic and the CIB can be broken down into several major categories: clocks, reset, status, transmit, and receive.

Clock Signals to CIB

| Signal name | Definition |
| --- | --- |
| Clk | Core logic clock |

The CIB interface to the core logic runs off of the core logic clock, nominally at 200 Mhz. From the core logic's point-of-view, the CIB appears to be purely synchronous on the core logic clock. Furthermore, from the CIB logic's point of view, the transceivers ALSO appear to be synchronous on the core logic clock. Any "magic" with phased clocks and higher frequencies is hidden inside of the transceivers.

Clock Control Block to CIB

| Signal name | Definition |
| --- | --- |
| power_on_reset | power-on reset from clock control block |
| pll_lock | indication that the PLL is locked and is stable and can be used |

The CIB logic ignores power_on_reset—this signal just gets passed through to the transceivers. The CIB logic uses pll_lock as its reset signal. Once pll_lock is achieved, the CIB comes out of reset and waits for ch_ready (Channel ready) to be asserted to begin operation. In an alternate embodiment hard and soft reset are communicated from master to slave via the CIB.

CIB Status to Core Logic Signals

| Signal name | Definition |
|---|---|
| ch_ready | indication that the Channel is operational |
| tr_t_dll_locked | status output: transmitter DLL lock achieved |
| tr_r_dll_locked | status output: receiver DLL lock achieved |
| tr_drvr_calibrated | status output: drivers calibrated |

The CIB outputs a ch_ready (Channel Ready) signal to indicate that the Channel logic is operational (calibrated, in sync, etc.). The ch_ready signal should go active (high) some time after IC power is stable, and should stay active (unless there is a fatal error). If the signal does not go active, or ever goes inactive, then the Channel has been unable to calibrate itself and/or get in sync with the other end. (The assumption is that the ch_ready, tr_t_dll_locked, tr_r_dll_locked, and tr_drvr_calibrated signals will be passed through to the core logic and latched in a CSR which software can read in order to determine why a particular Channel failed to become ready. The core logic should also provide a "timeout" which will "give up" on a Channel if it does not become ready in a predetermined interval after reset.).

The ch_ready output of the CIB is a function of the transceivers being ready, and of the CIB logic being ready. The transceiver ready status is initially derived from status outputs of the transceivers:

trcvr_ready=tr_t_dll_locked && tr_r_dll_locked && tr_drvr_calibrated;

Note that tr_drvr_calibrated may become deasserted if the Channel is recalibrated. The ch_ready output of the CIB, on the other hand, must stay active once asserted; the CIB logic must ensure that ch_ready is held active during recalibration. (The ch_t_backoff signal should be asserted to the core logic during recalibration so that the core logic will not attempt to use the Channel.)

In addition to taking in to account trcvr_ready, the ch_ready output of the CIB must also account for any initialization protocols the CIB itself uses (such as the TC_RESET protocol); ch_ready should not be asserted until after the CIB is able to accept data from the core logic.

Configuration Signals to CIB from Core Logic

| Signal name | Definition |
|---|---|
| ch_half_speed | run the Channel at half-speed |
| ch_master | if active, indicates that this is a master (as opposed to a slave) IC |
| ch_power_down | notification that the Channel should shut off |
| ch_retry_count[1:0] | encoded indication of how many times to retry |

The core logic sends a ch_power_down signal to the CIB to indicate that the Channel is not connected (or should be powered down for some other reason). ch_power_down can be used for configuration purposes (for Channels that are unused), or for dynamic (but relatively slow) power management. The ch_power_down signal should not be used in a dynamic fashion; the Channel can take msec. to become ready once it has been powered down. Note that when ch_power_down is asserted, any active communication on the Channel will be lost. When ch_power_down is asserted, the CIB will deassert ch_ready and will assert ch_t_backoff.

The ch_retry_count[1:0] signal is a two-bit input to the CIB which controls how hard the CIB should attempt to recover in the event of an error; specifically it encodes how many retries should be attempted prior to attempting recalibration of the Channel. The encoding is:

| ch_retry_count[1:0] | definition |
|---|---|
| 00 | recalibrate every retry |
| 01 | recalibrate every 4 retries |
| 10 | recalibrate every 16 retries |
| 11 | never recalibrate |

This signal should be driven from a CSR in the core logic. (Ideally, these signals will be set the same way on both sides of the Channel.)

The retry count controls the total number of retries (TC_SYNCs) generated before Channel recalibration is attempted. Channel recalibration will always be tried sixteen times (with ch_retry_count controlling the number of TC_SYNC attempts between each recalibration). If after all these retries/recalibrations, the Channel is still not functional, a fatal error (ch_r_fatal) is declared. Note that ch_retry_count==3 will never recalibrate and will never signal a fatal error.

Core Logic to CIB

| Signal name | Definition |
|---|---|
| ch_t_data[63:0] | command or data to be sent |
| ch_t_chk[3:0] | low nibble ECC on 64 transmitted data bits |
| ch_t_ctl[1:0] | control information |

CIB to Core Logic

| Signal name | Definition |
|---|---|
| ch_t_chk_err | supplied ch_t_chk does not match ch_t_data |
| ch_t_backoff | stop sending |
| ch_t_retry | a correctable error has occurred |
| ch_t_fatal | a fatal error has occurred (e.g., loss of sync, block could not be sent) |

The ch_t_ctl signal has the following definition:

| ch_t_ctl[1:0] | mnemonic | defnintion |
|---|---|---|
| 00 | IDLE | IDLE cycle (no valid data on ch_t_data) |
| 01 | DERR | Data ERRor (invalid; used for ECC errors on data) |
| 10 | CMND | CoMmaND cycle (ch_t_data has a command) |

-continued

| ch_t_ctl[1:0] | mnemonic | defnintion |
|---|---|---|
| 11 | DATA | DATA cycle (ch_t_data has data) |

In some sense, the ch_t_ctl signal, distinguishing command and two types of data, acts as two extra data bits to the CIB—ch_t_ctl needs to be sent to the receiving Channel interface where it is passed through to the receiving core logic. The ch_t_ctl signal also acts as a "valid" indication; it is non-zero when the core logic is sending meaningful information. The ch_t_backoff signal is a flow control mechanism. When asserted by the CIB, the current transfer cycle is the last that can be accepted. ch_t_backoff MUST be asserted by the CIB until the Channel is ready (until ch_ready is asserted). In operation, starting on the cycle following the assertion of ch_t_backoff, the core logic MUST assert ch_t_ctl==00, and must continue asserting ch_t_ctl==00 until (at least) the last cycle in which ch_t_backoff==1.

Notable Combinations

| ch_t_backoff | ch_t_ctl | notes |
|---|---|---|
| 0 | 01 or 1x | data accepted by CIB |
| 0 | 00 | idle cycle |
| 0 | 01 or 1x | data accepted by CIB |
| 1 | 01 or 1x | data accepted by CIB |
| 1 | 00 | data not accepted by CIB |

The ch_t_data and ch_t_ctl signals should be assumed to have a very small amount of setup time prior to the next core logic clock. (The CIB could put at most a couple levels of logic on these signals, as should the core logic due to wire delay between the core logic and the CIB.) The ch_t_backoff signal should be driven by the CIB from a flip-flop (on the core logic clock) with at most one or two levels of following gate delay. The core logic should similarly put no more than a few levels of gate delay on this signal prior to a flip-flop. The ch_t_chk signal provides parity-like validation on the ch_t_data lines from the core logic; ch_t_chk should be provided in phase with ch_t_data. The CIB will sample both ch_t_data and ch_t_chk, will verify the "parity" on these signals, and in the event of bad parity will return an error on ch_t_chk_err on the following cycle (two cycles after ch_t_data/ch_t_chk were presented to the CIB). Note that IC-internal errors such as this are assumed to be system-fatal. The Channel will ignore any errors on ch_t_chk, and will generate its own ECC independent of ch_t_chk.

A one-cycle pulse on the ch_t_retry signal indicates that a TC_SYNC was received (meaning that the other side of the Channel reported a transmission error); every TC_SYNC that is received will generate such a ch_t_retry one-cycle pulse. The transmitting side of the Channel cannot declare a transmit fatal error due to TC_SYNCs because it does not know when the receive side will "give up". (Channel recalibration takes an unknown amount of time.)

A fatal error is asserted on ch_t_fatal (as a one-cycle pulse) when the transmit FIFO overflows. This can only happen when the core logic has not obeyed the flow-control rules regarding ch_t_backoff. (This is only one example of ch_t_fatal errors. Other errors will be discussed below.)

The signals ch_t_retry and ch_t_fatal are not necessarily related to any particular data transfer cycle. They are provided for error logging and/or system reset purposes.

CIB to Core Logic

| Signal name | Definition |
|---|---|
| ch_r_data[63:0] | command or data received |
| ch_r_chk[3:0] | low nibble ECC on 64 received data bits |
| ch_r_ctl[1:0] | control information |
| ch_r_valid | data/ctl validation signal (post ECC) |
| ch_r_retry | a correctable error has occurred |
| ch_r_fatal | a fatal error has occurred (e.g., loss of sync, block could not be received) |

Core Logic to CIB

| Signal name | Definition |
|---|---|
| ch_r_backoff | stop receiving |

The ch_r_ctl signal has the following definition:

| ch_r_ctl[1:0] | mnemonic | defnintion |
|---|---|---|
| 00 | IDLE | IDLE cycle (no valid data on ch_r_data) |
| 01 | DERR | Data ERRor (invalid; used for ECC errors on data) |
| 10 | CMND | CoMmaND cycle (ch_r_data has a command) |
| 11 | DATA | DATA cycle (ch_r_data has data) |

The ch_r_ctl signal indicates to the core logic what type of data is present on the ch_r_data lines: a command, or one of two types of data. The ch_r_ctl signal also acts as a "valid" indication; it is non-zero when there is meaningful information to be sent to the core logic. The ch_r_backoff signal is a flow control mechanism. When asserted by the core logic, the current transfer cycle is the last that can be accepted. The CIB MUST assert ch_r_ctl==00 the following clock cycle, and on any following cycles until (at least) the cycle after the last one in which ch_r_backoff==1.

Notable Combinations

| ch_r_backoff | ch_r_ctl | notes |
|---|---|---|
| 0 | 01 or 1X | data accepted by core logic |
| 0 | 00 | idle cycle |
| 0 | 01 or 1X | data accepted by core logic |
| 1 | 01 or 1x | data accepted by core logic |
| 1 | 00 | data not accepted by core logic |

The ch_r_data and ch_r_ctl signals should be assumed to have a very small amount of setup time prior to the next core logic clock. (The core logic could put at most a couple levels of logic on these signals, as should the CIB due to wire delay between the core logic and the CIB.) The ch_r_backoff signal should be driven by the core logic from a flip-flop (on the core logic clock) with at most one or two levels of following gate delay. The CIB should similarly put no more than a few levels of gate delay on this signal prior to a flip-flop.

In one embodiment, the timing on ch_r_valid is about 1.5 ns. behind ch_r_data and ch_r_ctl. The purpose of this signal is to be able to provide the ch_r_data and ch_r_ctl earlier, prior to their being fully error checked, thus allowing the core logic to start arbitrating for resources earlier when a CMND cycle is received. The ch_r_valid signal is only useful if it can appear (later) in the same clock cycle as ch_r_data and ch_r_ctl.

The ch_r_chk signal provides ECC-like parity coverage on the data returned to the core logic (on ch_r_data). This signal is provided by the CIB because it is easy to compute during the ECC check of the data received from the Channel.

When a receive error is detected (by the receipt of bad ECC, or possibly because the receive FIFO overflows), the CIB logic will initiate a retry procedure. (See the description of ch_retry_count above.) If retry is successful, a one-cycle pulse is generated on the ch_retry signal; if retry fails, a one-cycle pulse is generated on the ch_r_fatal signal. After a fatal error, the Channel should shut down. (This is only one example of ch_r_fatal errors.)

The signals ch_r_retry and ch_r_fatal are not necessarily related to any particular data transfer cycle. They are provided for error logging and/or system reset purposes.

CIB Logic

The CIB forms a full-duplex, bidirectional interface between the core logic and the Channel; the CIB logic forms a similar full-duplex, bi-directional interface between the core logic and the transceivers inside the CIB.

The CIB implements a link-level and a physical transport layer and as such does not do any interpretation of what is being sent. In particular, the CIB does not distinguish "command" cycles from "data" cycles, other than by passing through whatever command/data distinction is provided by the core logic.

The core logic assumes the CIB can both send and receive at the same time (though whether the transceivers do this over one set of wires or two should be invisible to the core logic). The interface protocol to the core logic will support half-duplex communication, but for performance reasons in a half-duplex system, the core logic would preferably have some way of controlling the arbitration policy to prioritize send and receive; this is not provided in the interface as a half-duplex mode is not anticipated.

The core logic assumes that the CIB does its own error detection and retry so that any "uncorrectable" errors (those that fail any error correction and/or retry) can be deemed to be system fatal.

Packet Format The Channel transport protocol sends and receives 80 bits each cycle through the Channel transceiver interface. The transport protocol internally deals with 64 data bits, 8 error detection bits, and 8 control bits. They are mapped onto the transceiver's 80-bit interface as follows:

| Transceiver | Transport |
| --- | --- |
| tr_data[79:64] | data[63:48] |
| tr_data[63:60] | ctl[7:4] |
| tr_data[59:44] | data[47:32] |
| tr_data[43:40] | ctl[3:0] |
| tr_data[39:24] | data[31:16] |
| tr_data[23:20] | ecc[7:4] |
| tr_data[19:4] | data[15:0] |
| tr_data[3:0] | ecc[3:0] |

The ctl[7:0] bits encode both the ch_t_ctl/ch_r_ctl information provided by/sent to the core logic, and state information for the CIB logic. The ctl[7:0] bits are defined as:

| ctl | Mnemonic | Definition |
| --- | --- | --- |
| ctl[7:6] | Tctl[1:0] | Transmit control: indicates how to interpret the data [63:0] field |
| ctl[5:4] | Tseq[1:0] | Transmit sequence: value for data ackets is the low two bits of the T_fifo entry number that stored the transmitted data (the two low bits of TF_xmit_ctr prior to its increment). Value for control and idle packets should be 0. |
| ctl[3] | Rack | If asserted on any kind of transfer, indicates that the receiver has correctly received a data packet transfer and passed it on to the receiving core logic. |
| ctl[2] | Rbackoff | If asserted for any kind of transfer, indicates that the receiver's buffer s filling up and data packet transfers should be halted until a transfer is received with Rbackoff deasserted. |
| ctl[1:0] | (reserved) | |

Transmit Control Sub-table

| Tctl[1:0] | mnemonic | definition |
| --- | --- | --- |
| 0 × 0 | T_CTRL | data[63:56] T_CTRL sub-command; data[55:52] TC_ack_ctr: receive ack counter indicates the current value of R_data_ctr in the transmitting CIB. Valid only for TC_SYNC and TC_SACK; and data[51:0] (reserved) |
| 0 × 1 | T_CMND | data[63:0] is a Channel protocol command packet |
| 0 × 2 | T_DATA | data[63:0] is a Channel protocol data packet |
| 0 × 3 | (reserved) | |

T_CTRL Sub-command Sub-sub-table

| T_CTRL[7:0] | definition |
| --- | --- |
| 0x00 | TC_IDLE (ch_t_ctl IDLE) |
| 0x01 | TC_DERR (ch_t_ctl DERR) |
| 0x02 - 0x03 | (reserved) |
| 0x04 | TC_SYNC |
| 0x05 | TC_SACK |
| 0x06 - 0x07 | (reserved) |
| 0x08 | TC_RESET |
| 0x09 | TC_RESET_ACK |
| 0xA - 0xFF | (reserved) |

(Note: the instant disclosure employs a convention of using T_CTRL sub-commands to imply a T_CTRL command with that sub-command specifier. For example, a TC_IDLE refers to a T_CTRL command (Tctl=T_CTRL) with the data field specifying TC_IDLE.)

The ecc[7:0] field provides error DETECTION coverage over the full packet, i.e., ecc[7:0] Covers data[63:0] and ctl[7:0]. Although the error detection code actually does provide information for single bit error correction, this is not used for Channel data. Instead the data transfer is retried using the transport retry protocol.

Packet Types. There are three general classes of packets that can be transferred across the Channel: data, idle, and control.

Data Packets. Data packets are transfers with a Tctl field of T_CMND, T_DATA, or TC_DERR. They are the only packet types that consume resources in the transmitting and receiving FIFOs in the CIB.

Idle Packets. Idle packets are transfers with a Tctl field of TC_IDLE (when traveling between CIB instances in two ICs). When transferring to or from the core logic, idle packets are indicated with an IDLE indication on the ch_t_ctl or ch_r_ctl bits.

Control Packets. Any non-idle packet that is transferred between two instances of a CIB and not passed onto the receiving core logic is a control packet. These have a Tctl type of T_CTRL and a subtype that is not TC_DERR or TC_IDLE.

Components. Each Channel transport block contains two FIFOs, the T_FIFO and the R_FIFO, each 16 entries by 70 bits. The 70 bits are 64 data bits, 2 control bits, and 4 check (ECC) bits which provide parity coverage for the data bits. Note that the FIFOs store the check bits received from (for the transmit FIFO) or to be sent to (for the receive FIFO) the core logic. These check bits are not directly related to the check bits sent over the Channel; they are provided to allow for "end-to-end" coverage of the datapaths inside the core logic.

T_fifo. This FIFO is filled by the core logic. It is emptied by transmitting over the transceiver interface and receiving an acknowledgment indicating that the data has been correctly passed to the receiving IC's core logic. There are three counters that are used to point to different entries of T_fifo: TF_fill_ctr, TF_xmit_ctr, and TF_ack_ctr. Each of these counters is reset to zero initially, and when incremented, counts modulo the size of T_fifo. There is a one bit indicator, TF_full, that is used to distinguish all entries being empty from all entries being full (either of which may be true when TF_fill_ctr and TF_xmit_ctr have the same value).

TF_fill_ctr

This indicates the entry of T_fifo that will be filled with the next non-idle data transfer from the core logic. Once the data is entered into T_fifo, the value of TF_fill_ctr is incremented (modulo the size of T_fifo). If the value of TF_fill_ctr is now one less than the value of TF_ack_ctr, ch_t_backoff should be asserted to the transmitting core logic. If the value of TF_fill_ctr is now equal to the value of TF_ack_ctr, TF_full should be asserted. If TF_full is asserted and a data packet is transferred from the core logic, a fatal error must be signaled.

TF_xmit_ctr

This indicates the entry of T_fifo that will next be transmitted over the transceiver interface. If TF_xmit_ctr is equal to TF_fill_ctr and TF_full is off, no data needs to be transferred and the transceiver should be given an idle packet. Otherwise, the T_fifo entry pointed to by TF_xmit_ctr should be sent over the transceiver interface and TF_xmit_ctr should be incremented (modulo the size of T_fifo). If a receive ack counter value is received as part of a TC_SYNC packet (the TC_ack_ctr field), the value of TF_xmit_ctr should be set from that value.

TF_ack_ctr

This indicates the entry of T_fifo that will next be acknowledged by a received Rack over the transceiver interface. Once an Rack indication has been received from the transceiver interface, the value of TF_ack_ctr is incremented (modulo the size of T_fifo). If a receive ackcounter value is received as part of a TC_SYNC or a TC_SACK packet (the TC_ack_ctr field), the value of TF_ack_ctr should be set from that value. If TF_ack_ctr no longer has the same value as TF_fill_ctr and TF_full was asserted, TF_full must be deasserted. If ch_t_backoff was being indicated to the transmitting core logic, it can be deasserted if there are at least two empty slots between TF_fill_ctr and TF_ack_ctr.

TF_full

See the description of TF_fill_ctr and TF_ack_ctr for how TF_full is controlled.

R_fifo. This FIFO is filled by receiving data packets from the transceiver interface that do not have any errors. It is emptied by sending to the core logic (as long as the core logic is not asserting ch_r_backoff). There are three counters: RF_fill_ctr, RF_xmit_ctr, and R_data_ctr. Each of these counters is reset to zero initially. When incremented, RF_fill_ctr and RF_xmit_ctr increment modulo the size of R_fifo; R_data_ctr increments modulo the size of T_fifo. There is a one bit indicator, RF_full, that is used to distinguish all entries being empty from all entries being full (either of which may be true when RF_fill_ctr and RF_xmit_ctr have the same value).

RF_fill_ctr

This indicates the entry of R_fifo that will be filled with the next (correctly) received data packet from the transceiver interface. Once the entry is entered into R_fifo, the value of RF_fill_ctr is incremented (modulo the size of R_fifo). If the number of empty slots in R_fifo is now 8 or less, Rbackoff must be transmitted to the other end of the Channel. If the value of RF_fill_ctr is now equal to the value of RF_xmit_ctr, RF_full must be asserted.

RF_xmit_ctr

This indicates the entry of R_fifo that will next be sent to the receiving IC's core logic. If RF_xmit_ctr is equal to RF_fill_ctr and RF_full is off, R_fifo is empty and idle packets should be sent to the receiving IC's core logic. Packets may not be immediately sent if the receiving core logic is asserting ch_r_backoff. Once the entry is sent to the core logic, RF_xmit_ctr is incremented (modulo the size of R_fifo). If RF_xmit_ctr no longer has the same value as RF_fill_ctr and RF_full was asserted, RF_full must be deasserted. If the number of empty slots in R_fifo is now more than 8, the Rbackoff indication should be removed from transmissions across the Channel.

R_data_ctr

This counter does not actually point into R_fifo. It is used to count correctly received data packets. When a data packet is received correctly, an Rack indicator is added to the next outgoing packet. The value of R_data_ctr is then incremented (modulo the size of T_fifo). If the outgoing packet is a control or idle packet, the (incremented) value of R_data_ctr is placed in the receive ack counter (TC_ack_ctr) field of the outgoing packet. The value of R_data_ctr (in a receiver) should be identical to Th_ack_ctr (in a transmitter) once all Rack indicators in transit have been taken into account.

As each data packet is received, its Tseq field should be compared with the low two bits of the R_data_ctr (before it is incremented). If they are not the same, a sequencing error has occurred and the transport protocol enters "error retry" mode. (This is a "belt and suspenders" check which should not be necessary, but it's relatively cheap and may catch some types of errors, such as dropped packets, that would otherwise go undetected.) Note that R_data_ctr and RF_fill_ctr increment in lock-step—both increment whenever a data packet is correctly received. The only difference between these two counters is that RF_fill_ctr increments modulo the size of R_fifo, and R_data_ctr increments modulo the size of T_fifo; if the two FIFOs are the same size, only one counter is needed. (If R_fifo is bypassed when it is empty, then either RF_fill_ctr and RF_xmit_ctr must still be incremented, as if the bypassed data was put in to R_fifo and immediately removed, or R_fifo and R_data_ctr will not stay in sync.)

RF_full

See the description for RF_fill_ctr and RF_xmit_ctr for how RF_full is controlled.

CIB Logic General Operation. If not for errors and retries, the CIB logic would not be much more than a pair of FIFOs:

one transmit FEFO between the core logic and the transceivers, and one receive FIFO between the transceivers and the core logic. However, the CIB logic is more complex than this because it must generate ECC, detect errors, and invoke a retry procedure for error recovery. The algorithmic details of the retry procedure are discussed below in the description of the Channel transport protocol.

CIB Transmit Logic. The transmit side of the CIB logic receives data from the core logic and transmits it over the Channel. The data can be bypassed directly to the Channel, or it can enter a transmit FIFO, T_fifo, if the Channel is already backed up. (The Channel can only back up because of the receipt of an Rbackoff flow-control request from the other side.) Note that IDLE cycles from the core logic are not put in to the transmit FIFO.

If transmit FIFO bypassing is done because the T_fifo is empty, both TF_fill_ctr and TF_xmit_ctr must still be incremented, and the bypassed packet must be put in to the FIFO at the proper location (as pointed to by TF_fill_ctr before increment). If this is not done, then TF_ack_ctr is rendered meaningless, and the packet that was sent will not be available in T_fifo if it is needed again in the event of a reception error.

The first half of the data sent to the transceivers is sampled by the transceivers at phase 0 (the core clock rising edge); the second half of the data sent to the transceivers is sampled at phase 2 (nominally, the core clock falling edge). This provides about half a clock cycle for the ECC computation. A shadow register in the CIB logic holds the full data packet to be sent to the transceivers, roughly half of which was already sent at phase 0; ECC is computed from this shadow register, and the remaining half of the data and the ECC is sent in time to be sampled by the transceivers at phase 2.

The ECC generation circuitry also performs a check upon the ECC bits received with the data bits from the core (ch_t_chk provides coverage on ch_t_data). If there was an error detected in the data/ECC provided by the core, this is reported (after a flip-flop delay) on ch_t_chk_err.

CIB Receive Logic. The receive side of the CIB logic receives data from the Channel and transmits it to the core logic. Data from the Channel is synchronous with the core clock, and all 80 bits are available at once. The data must be ECC-checked; this is done in parallel with forwarding the data back to the core logic (via a bypassable receive FIFO, R_fifo). Note that IDLE cycles from the Channel, as well as control packets, are not put in to the receive FIFO.

ECC checking is done in parallel with sending the data back to the core logic; if an ECC error is detected, a late ch_r_valid signal is deasserted, notifying the core logic that the data is not valid. (Providing the data as early as possible lets the core logic being decoding it; the ch_r_valid signal can be then used by the core logic later in the same clock cycle as an enable on the data packet.) Data packets with ECC errors will not be put in to the receive FIFO. ECC error detection will put the CIB logic in "error retry" mode. The error retry process is described in more detail below in the description of the Channel transport protocol.

Half-Speed Operation. Half-speed operation means that the Channel itself is running with a half-speed clock; the ICs at either end of the Channel still run at full speed.

To run at half-speed, the CIB logic uses clock enables on all the flip-flops which connect directly to the transceivers. Flip-flops connecting to the core must still run at full speed.

When operating at half-speed, the CIB logic will manage sending data to and from the transceivers only every other cycle.

For the transmit side, the CIB logic will generate a clock enable, tr_clk_en_in, which it will provide to the transceivers along with the data. For the receive side, the transceivers will provide a clock enable, tr_clk_en_out, to the CIT logic.

(In an alternative full-speed embodiment, the transceivers send IDLE cycles to the CIB logic every other cycle. This does, however, imply transceiver knowledge of the control encoding.)

Channel Transport and Retry Procedure. The following description relies on the CIB logic on both sides of the Channel being reset and then "waking up" (via the Channel ready condition) at the same time. At reset, the state of all of the counters in the CIB logic should be zero.

Normal Transfer. During normal data transfer, a data packet is transmitted from the transmitting core logic to the transmitting CIB. If it is a data packet, it is placed in T_fifo. Once the entry is at the transmitting point of T_fifo (where TF_xmit_ctr points), and T_fifo is not held for some reason, the data packet, along with any control information for received status (Rack and/or Rbackoff) is sent to the transceiver interface. At some later point, this data arrives in the receiving CIB. If no errors are indicated (either through the ECC bits, through the Tseq field, or because R_fifo is full), then the data is entered into R_fifo for transmittal to the receiving core logic, and the value of R_data_ctr is incremented. To acknowledge the correct reception of a data packet, an Rack indicator is added to the next outgoing packet going back to the original transmitter. When the original transmitter receives a packet with Rack set, the value of TF_ack_ctr is incremented. The packet transfer is now complete.

Flow Control. The flow of data travels from the transmitting core logic to the transmitting CIB T_fifo to the receiving CIB R_fifo to the receiving core logic. Each of these four modules may indicate to the preceding one that it is no longer able to accept new data. Once that indication has been received, each module must send only non-data packets.

If the receiving core logic is no longer able to accept data packets, it must indicate this by asserting ch_r_backoff. The receiving core logic must be able to accept one more data packet after asserting ch_r_backoff. After that (as long as ch_r_backoff remains asserted), all transfers from the CIB to the receiving core logic must be idle packets.

If the receiving CIB's R_fifo fills up to the point that 8 or less empty slots remain in R_fifo, it must indicate to the transmitting CIB that a backoff condition exists (by asserting Rbackoff in packets it transmits). Once an Rbackoff indication has been received, the transmitting CIB can issue only non-data packets. The number 8 is chosen to handle a full round-trip time for the Rbackoff indication to get to the transmitting CIB and for the pipeline of data packets being transmitted to empty. Once the number of empty slots in R_fifo becomes greater than 8, the Rbackoff indication to the transmitting CIB can be removed (by deasserting Rbackoff in transmitted packets). It is possible, due to packets being received in error, for the Rbackoff indication to the transmitting CIB to not be acted upon. If the receiving CIB's R_fifo fills up, then the receiver goes into error retry mode (see below). (Data packets which cannot be put in to R_fifo because R_fifo is full are treated the same as data packets received with ECC errors.)

If the transmitting CIB's T_fifo fills to the point of having only one empty slot, a backoff indication should be sent to the transmitting core logic using ch_t_backoff. The transmitting CIB must be able to accept one more data packet from the transmitting core logic in the cycle after the ch_t_backoff is asserted. After that (as long as ch_t_backoff remains asserted), only idle packets may be transmitted from the core logic. Once there are two or more empty slots in T_fifo, ch_t_backoff should be deasserted.

Error Retries. Retriable errors can occur for several reasons:

- A packet can be received with bad ECC (as detected by the 8-bit ECC field transmitted with every packet).
- A packet may indicate that a previous packet was lost (if the Tseq sequence value does not match that expected sequence in the low two bits of the R_data_ctr).
- The R_fifo may be full because the transmitting CIB has lost or ignored earlier Rbackoff indications.

In any of these cases, the transport protocol enters a mode where the packet received in error is retried. Error retries affect one direction of data transfer only (except for control packets that must be sent back to initiate the retry). If errors occur simultaneously in both directions of travel, then error retry will occur in both directions.

The following rules govern the treatment of the Rack and Rbackoff bits in packets received with errors:

- All packets received with incorrect ECC or with Tseq errors should be assumed to have Rbackoff asserted; this conservative approach will keep receive FIFOs (at the other end of the Channel) from overflowing.
- All packets received with incorrect ECC or Tseq errors should be assumed to have Rack deasserted; this conservative approach will prevent TF_ack_ctr from incrementing, and will thus prevent possibly needed entries from being removed from T_fifo.
- Data packets which cannot be put in to R_fifo because R_fifo is full are treated as if they had an ECC error, except that Rack and Rbackoff in these packets are still honored.
- When data packets are not being accepted due to prior errors (during the window between sending TC_SYNC and receiving TC_SACK), the Rbackoff bit in packets with good ECC should be honored, but the Rack bit should be ignored. (This is a little bit of paranoia; Rack could be honored as well, but the worst thing that happens if it is ignored is a slight decrease in throughput due to the transmit FIFO filling up. The TC_SACK will properly reset TF_ack_ctr.)

Both sides of the Channel continuously transmit data unless forced to transmit idle packets because of:

their transmit FIFO is empty, their transmit FIFO is full of unacknowledged packets, or an Rbackoff condition from the other side.

The error retry procedure is used to adjust the transmit and acknowledge points—it does not stop either side of the Channel from transmitting. When an error is received, the receiving CIB will stop accepting data packets until it sends a TC_SYNC to the transmitting CIB, and receives an acknowledgment (a TC_SACK) that the transmitter has received and acted upon its TC_SYNC.

Once an error has been received by a CIB, its transport protocol receiving state machine will:

1. Throw away the packet that indicated an error and all following packets except for TC_SYNC or TC_SACK control packets. Once the receive state machine is in the mode that all received packets (other than TC_SYNC or TC_SACK) are ignored, any packet with good ECC should still have its Rbackoff bit (and only its Rbackoff bit) honored.
2. Once R_fifo has more than 8 empty slots, send a TC_SYNC to the originating CIB (the CIB that transmitted the packet in error). This causes a one cycle delay in transmitting data from T_fifo.
3. If a TC_SACK is received within 8 cycles of sending a TC_SYNC, mark the receiving state machine as being able to receive data packets once more. The TC_SACK will reset the value in the TF_ack_ctr (from the value provided in the TC_ack_ctr field of the TC_SACK).
4. If a TC_SACK has not been received within 8 cycles of sending a TC_SYNC, the TC_SYNC control packet must be resent.
5. If a TC_SYNC is received after sending a TC_SYNC, that indicates that errors occurred in both directions. The error retry will continue in both directions independently.

The CIB's transport protocol transmitting state machine will upon receiving a TC_SYNC control packet, reset the TF_ack_ctr and TF_xmit_ctr to the value of $TC_{ack}$_ctr (from the TC_ack_ctr field of the TC_SYNC), then transmit a TC_SACK packet and continue transmitting data packets from the (new) TF_xmit_ctr point (if any exist). If the TC_SYNC indicates that the TF_ack_ctr and TF_xmit_ctr should pass the TF_fill_ctr, a fatal error should be signaled.

The one complicating issue in this protocol is lost Racks due to data received in error. (Any reception error will cause Rack to be treated as if it was deasserted.) The side of the Channel which received the error will tell the other side where to resume transmission with a TC_SYNC, but its own TF_ack_ctr is now "conservative" (because some Racks may have been ignored). (The TF_xmit_ctr on the side of the Channel which received the error is fine—as long as that side does not itself receive a TC_SYNC, there have been no reception errors at the opposite side, and no data needs to be re-sent.)

Thus, we can recover from the missing Racks by sending the correct TF_ack_ctr with the TC_SACK reply to the TC_SYNC. The correct value to send is the (post-increment) value of R_data_ctr. (In this case, however, there is no increment of R_data_ctr since the previous cycle was a TC_SYNC, not a data cycle.) One way to view this is that instead of sending an Rack to update TF_ack_ctr, we are sending the R_data_ctr itself as the correct value of TF_ack_ctr; this is proper because TF_ack_ctr and R_data_ctr should be identical once all in-flight Racks are taken in to account. (In fact, if pins were not an issue, R_data_ctr could simply be sent every cycle, instead of just sending an Rack which increments TF_ack_ctr whenever R_data_ctr increments.)

There is a guarantee that there is never a need to send a TC_SYNC and TC_SACK in the same cycle. This is because the only time a CIB needs to send a TC_SACK is the cycle after it successfully receives a TC_SYNC, and if a CIB successfully receive anything, it doesn't have to send a TC_SYNC. Also, note that since the protocol only sends an Rack for data packets, it never has to send an Rack with a TC_SACK (because the TC_SACK acknowledges a TC_SYNC, not a data cycle).

Observations. Errors are detected independently on both sides—while one side is sending TC_SYNC because it received an error, it may still be transmitting correctly to the other side! A reception error does not cause transmission to stop. So the TF_xmit_ctr (of the side that received the error and is sending TC_SYNC) is happily incrementing with each data packet it sends, even while the error retry procedure is in progress.

A TC_SYNC moves TF_xmit_ctr backwards (requesting data that was not properly received to be sent again); in the absence of errors in the opposite direction (causing missing Racks), a TC_SYNC should not move TF_ack_ctr at all—the retransmit point should be the same as the "next to be ACKed" point. (If there were errors in the opposite direction and Racks have been lost, then TF_ack_ctr could move forwards.) In fact, receipt of a TC_SYNC does not actually have to adjust TF_ack_ctr! It does not hurt to do so, but if TF_ack_ctr is incorrect, it can only be because Racks were lost, and that can only happen if errors were received. Receiving errors implies that a TC_SYNC will also be sent, and the TC_SACK received in response to this TC_SYNC will update TF_ack_ctr to the correct value.

A TC_SACK should only move TF_ack_ctr forwards (acknowledging more data than previously believed). TF_ack_ctr could be advanced as far forward as TF_xmit_ctr by this operation (if, for some odd reason, there have been nothing but non-data packets sent for a while). In the more typical case, TF_ack_ctr will be advanced to a value that's about one round-trip delay behind TF_xmit_ctr (corresponding to the number of Racks and the number of good data packets already in progress behind the TC_SACK).

The error retry process does rely on the fact that the TC_SACK-sender will also send a TC_SYNC if it detects any errors (ECC, sequence, overflow, whatever). This symmetric procedure is not a problem, other than in the presence of undetected errors (which are a problem no matter what).

Reset Protocol. It is highly desirable to have a synchronous way to reset the entire chipset so that reset is a repeatable and deterministic process; this greatly aids debug, simplifies testing, and generally makes life more pleasant. Since the master IC controls when the chipset is reset, it is natural to use the master IC to communicate this reset information to all slave ICs synchronously via the Channel.

The reset protocol uses the following additional pins between the core logic and the CIB.

Core Logic to CIB

| Signal name | Definition |
| --- | --- |
| ch_system_reset | start the system reset protocol; should only be asserted on a master IC |

CIB to Core Logic

| Signal name | Definition |
| --- | --- |
| ch_clear_reset | indicates receipt of the first TC_RESET command; should only be driven on slave ICs |
| ch_sync_reset_failed | indication that the reset protocol did not work properly the first time |

Each IC in the chipset will have a reset I/O pin which should be assumed to be asynchronous. When active, the IC will enter a reset state. Slave ICs will stay in the reset state, even if the reset pin goes inactive; only the master IC will "wake up" when its reset pin is deasserted. When it wakes up, the master IC will wait for all of its Channels to be ready (or for a timeout period to elapse—some of the Channels may be disconnected or non-functional). During this period, and until the reset protocol is complete, the master IC should only be sending IDLE packets to all of its Channels.

When the master IC is ready, it will reset the rest of the system by sending a one-cycle pulse on "ch_system_reset" from the core logic to all of its CIBs. When a master CIB receives ch_system_reset, it will (on the following cycle) assert ch_t_backoff to the core logic until the reset protocol is complete. Once ch_t_backoff is deasserted, the master IC can start exchanging data with the slave ICs.

The reset protocol in the CIB starts with the master IC sending a TC_RESET command to the slave IC; the slave IC will respond with a TC_RESET_ACK command. When the slave IC receives its first TC_RESET command, it will drive the ch_clear_reset signal to the core logic for one cycle—this signal is used to clear the reset state in the slave IC, allowing the slave IC to begin operation. (The slave CIB should never assert ch_t_backoff as part of the reset protocol; the core logic in the slave IC will not transmit anything other than IDLE packets until it is taken out of reset by the assertion of ch_clear_reset.) If the slave CIB receives a second TC_RESET command, this is evidence that the master CIB failed to receive the TC_RESET_ACK; the slave CIB should assert (and hold) the ch_sync_reset_failed signal to the core logic. (This signal is reported via a core logic CSR; it is not itself indicative of an error, just of a failure to reset synchronously.) Receipt of multiple TC_RESET commands is not fatal; subsequent TC_RESET commands should send a TC_RESET_ACK, but should otherwise be ignored by the slave CIB. Even if the slave core logic is trying to transmit, the error retry procedure will handle any communication problems it has with the master CIB (assuming that the master is able to receive correctly at some point).

When the master CIB receives the TC_RESET_ACK, it will deassert ch_t_backoff and be ready for operation. If the master CIB does not receive TC_RESET_ACK, it should follow a procedure identical to the one it uses with TC_SYNC/TC_SACK: transmit a new TC_RESET every eight cycles until a TC_RESET_ACK is seen, and try to recalibrate the Channel if the ch_retry_count limit is exceeded. If the first TC_RESET sent by a master CIB does not succeed, the master CIB should assert (and hold) the ch_sync_reset_failed signal to the core logic. (This signal is reported via a core logic CSR; it is not itself indicative of an error, just of a failure to reset synchronously.) If the master CIB fails to receive a TC_RESET_ACK after it has exhausted its retry/recalibration limit, a fatal error should be signaled on ch_t_fatal.

Note that the TC_SYNC/TC_SACK protocol could be invoked during the TC_RESET/TC_RESET_ACK protocol! For example, if either side receives an error instead of the expected TC_RESET or TC_RESET_ACK, it will respond with a TC_SYNC. The TC_SYNC/TC_SACK protocol should be run "inside" the TC_RESET/TC_RESET_ACK protocol; as long as TC_SYNC/TC_SACK retry succeeds, the TC_RESET/TC_RESET_ACK protocol can continue. If either protocol fails, a fatal error should be signaled on ch_t_fatal.

List of Errors Detected. The detection of any fatal error results in a one-cycle pulse being asserted on ch_r_fatal or on ch_t_fatal. (Subsequent errors may generate a second pulse.) The following types of errors are detected by the CIB logic:

1). Transmit timeout if there is no recognizable Rack or TC_SYNC within 64K cycles of sending a data packet. This is a transmit fatal error. (Note that the time-out interval for this error must be greater than the worst-case time it takes a Channel to retry, given both TC_SYNC retries and recalibration.)

2). T_fifo overflow (due to core logic not obeying the ch_t_backoff flow control protocol). This is a transmit fatal error.

3). Channel retry/recalibration procedure fails. This is a receive fatal error.

4). Channel recalibration does not complete within a timeout period (as indicated by tr_drvr_calibrated being asserted). This is a receive fatal error.

5). The TC_ack_ctr in a TC_SYNC attempts to advance TF_xmit_ctr/TF_ack_ctr past TF_fill_ctr. This is a transmit fatal error.

6). The TC_ack_ctr in a TC_SACK attempts to advance TF_ack_ctr past TF_xmit_ctr. This is a receive fatal error.

7). The TC_ack_ctr in a TC_SACK attempts to move TF_ack_ctr "backwards" (decreasing its value, but not past T_fill_ctr). This is a receive fatal error.

8). Receipt of more than one TC_SACK in an 8-cycle window (in response to a single TC_SYNC). This is a receive fatal error.

9). Failure to receive a TC_RESET_ACK command in response to a TC_RESET command (after exhausting the retry/recalibration limit). This is a transmit fatal error.

Channel Transport Protocol

Channel Transport Protocol Overview. The channel transport protocol is used to reliably transfer data from one chip to another in the face of errors and limited buffering. Each end of a channel is connected to a Channel Interface Block (CIB). The transport protocol is implemented in the CIB. The transport protocol should not be confused with the channel protocol, which describes the format of the command cycle and what data cycles follow it. The transport protocol does not care what kind of data is being sent over the channel wires.

There are a total of 25 wires for each channel connection:

| | |
|---|---|
| PP_data[15:0] | 16 bi-directional data wires |
| PP_ctl[3:0] | 4 bi-directional control wires |
| PP_clkin | |
| PP_clkout | 2 uni-directional clock wires |
| PP_ref[1:0] | 2 voltage reference lines |
| PP_speed | 1 full speed/half speed control pin |

The PP_data and PP_ctl signals are transmitted and received four times within each 200 MHz clock, giving an effective transfer rate of 800 million transfers/sec, or 1.6 GBytes/sec. Each channel transfer is 64 bits of data (in four beats of 16 bits each) and 16 bits of control (in four beats of 4 bits each) as shown below:

| | Beat | | | |
|---|---|---|---|---|
| | 0 | 1 | 2 | 3 |
| PP_ctl[3] | reserved | reserved | ecc[7] | ecc[3] |
| PP_ctl[2] | T_ctl[2] | R_fstat[1] | ecc[6] | ecc[2] |
| PP_ctl[1] | T_ctl[1] | R_fstat[0] | ecc[5] | ecc[1] |
| PP_ctl[0] | T_ctl[0] | R_ctl[0] | ecc[4] | ecc[0] |
| PP_data[15:0] | data[63:48] | data[47:32] | data[31:16] | data[15:0] |

Transmit Control Sub-table

| T_ctl[2:0] | Command | Description |
|---|---|---|
| 000 | T_IDLE | not sending anything on data pins |
| 001 | T_CMND | command cycle on data pins |
| 010 | T_DATA | data cycle on data pins |
| 011 | T_DERR | data in error cycle on data pins |
| 100 | T_SYNC | transport error occurred, re-synchronize; data pins contain counter values |
| 101 | T_SACK | synchronize acknowledge; data pins contain counter values |
| 110 | reserved | |
| 111 | reserved | |

Receive FIFO Status Sub-table

| R_fstat[1:0] | Command | Description |
|---|---|---|
| 00 | RF_EMPTY | empty; send at will |
| 01 | RF_AEMPTY | almost empty; send at will |
| 10 | RF_AFULL | almost full; send 50% of time |
| 11 | RF_FULL | full; do not send |

Receive Control Sub-table

| R_ctl[0] | Command | Description |
|---|---|---|
| 0 | R_IDLE | nothing received |
| 1 | R_ACK | correct data received |

Error Correction Code Sub-table

| Ecc[7:0] | cover all 64 bits of data and the control pins over the first two beats |
|---|---|

Internal Mechanisms. Each CIB has two fifos. T_fifo: This FIFO is filled from the chip's core and emptied by transmitting over the channel wires and receiving an R_ACK corresponding to this entry. This isn't a pure FIFO. There are three interesting positions in this FIFO. The point that new entries from the core are added (at the back of the fifo). The point where the next data to transmit is (in the middle of the fifo). The point where the oldest non-acknowledged data is (at the front of the fifo). Each entry in the fifo has a number associated (and perhaps stored) with it. This number is used in association with the T_count counter to reliably transmit the data cycles. R_fifo: This FIFO is filled by receiving data over the channel wires and emptied by sending to the chip's core. These fifos would typically be 12 entries long. The fifos are emptied when channelReady is raised to the chip core.

Each CIB has two counters. T_count: an N bit counter that increments whenever a data cycle is transmitted over the channel. Data cycles are those with T_CNMD, T_DATA, or T_DERR transmit status. R_count: an N bit counter that increments whenever a data cycle is received over the channel.

The value of N is chosen so that the values of counts are larger than the number of entries in the corresponding fifo. In the case of 12 entry fifos, the value of N would be 4. The count values are initialized to zero when channelReady is raised to the chip core. The values can be effectively set by the receipt of a T_SYNC or T_SACK channel cycle.

Back-Off. There are back-off signals that control whether either of the fifos may empty. If the fifos begin to fill up, the back-off status must be passed through to the entity that is filling the fifos as well:

transmitting core -> CIB T_fifo -> CIB R_fifo -> receiving core

The receiving core has a signal that it can assert to the R_fifo in the CIB to tell it that no more data can be received. The CIB must transmit IDLE cycle to the core while this signal is asserted.

As the R_fifo begins to fill up, the receiving CIB sends fifo status (R_fstat[1:0]) across the channel control wires to the transmitting CIB. The receiving CIB uses lo, mid, and hi water marks of empty entries in the R_fifo to determine what to set in R_fstat[1:0]. Given a fifo size of 12 entries, the values would be:

| Empty Entries | R_fstat |
|---|---|
| 12–9 | RF_EMPTY |
| 8–7 | RF_AEMPTY |
| 6–5 | RF_AFULL |
| 4–0 | RF_FULL |

The number of empty entries that prompt an RF_FULL fifo status must be at least as large as the number of cycles to transmit the status across the channel wires and have the data received and acted upon by the transmitting CIB.

The transmitting CIB will use the fifo status that it received to either transmit data (if it available in the T_fifo) on every cycle, on every second cycle (the other cycles being send as T_IDLE), or to stop transmitting data entirely (and transmit only T_IDLE cycles).

As the transmitting CIB is slowing down, entries may being filling up in the T_fifo. As they reach a low water mark of empty entries in the fifo, a signal is sent to the transmitting core that no more data can be accepted.

Channel Link Protocol

Channel Link Frame. The table below identifies the fields in each frame:

| Bit Positions | Field | Description |
|---|---|---|
| 63 | Reserved | Reserved |
| 62:59 | CMD | Command |
| 58 | D | Data Cycles |
| 57:56 | TY | Type |
| 55:48 | BE | Byte Enable |
| 47:46 | LEN | Length |
| 45:42 | CID | Channel Identifier |
| 41:40 | SCID | Sub-channel Identifier |
| 39:36 | QID | Queue Identifier |
| 35:32 | ADDR[38:35] | Upper Address Bits |
| 31:0 | ADDR[34:3] | Lower Address Bits |

Individual fields within the Channel link frame are defined below.

Command Field (CMD). This field encodes the channel command. Based on the command value, the BE, LEN, and ADDR fields may be overloaded with an alternate function as shown in table and sub-tables:

| | | | Overloaded Fields | | | |
|---|---|---|---|---|---|---|
| [62:59] | mnemonic | Name | BE | LEN | ADDR | Comments |
| 0000 | RDU | Read Uncacheable | | | | No overloadings |
| 0001 | RDE | Read Exclusive (reply may be RDE or RDS) | | | | No overloadings |
| 0010 | RDS | Read Shared | | | | No overloadings |
| 0011 | RDM | Read for Modify | Yes | Yes | No | Causes these overloadings: LEN field encodes cache line length (32 or 64-as detailed in field descriptions found elsewhere) BE field encodings: 0 x 00 - - - No data transfer 0 x ff - - - Data transfer |
| 0100 | RDC | Read Coherent | | | | No overloadings. Returns cache coherent data for initiators that will not cache data (I/O or RdBlkU in processors) |
| 0101 | — | — | | | | Reserved |
| 0110 | — | — | | | | Reserved |
| 0111 | — | — | | | | Reserved |
| 1000 | WRU | Write Uncacheable | | | | No overloadings |
| 1001 | — | — | | | | Reserved |
| 1010 | — | — | | | | Reserved |
| 1011 | WRB | WriteBack | Yes | Yes | No | LEN field encodes cache line length (32 or 64-as detailed in field descriptions found elsewhere) BE field encodings: 0 x 00 - - - No data transfer 0 x ff - - - Data transfer |
| 1100 | WRC | Write Coherent | | | | No overloadings |
| 1101 | — | — | | | | Reserved |
| 1110 | SOP | Special Operation | Yes | Yes | Yes | Causes these overloadings: LEN field always 00 BE field encodes which special operation, as listed elsewhere |

-continued

| [62:59] mnemonic | Name | Overloaded Fields | | | Comments |
|---|---|---|---|---|---|
| | | BE | LEN | ADDR | |
| 1111 COP | Cache Operation | Yes | Yes | No | Causes these overloadings:<br>LEN field encodes cache line length (32 or 64)<br>BE field encodes which operation in requests;<br>BE field encodes SCID/QID in replies for CWR/EV using format shown elsewhere |

"BE" Field Encoding for Special Operation (SOP) Overloading Sub-table:

| BE Field Code Value | Operation | Function |
|---|---|---|
| 0 × 01 | SHUT | Shutdown |
| 0 × 03 | HALT | Halt |
| 0 × 05 | INVD | Cache Invalid |
| 0 × 07 | WBINVD | WB Cache Invalid |
| 0 × 09 | FLUSHA | Flush Ack |
| 0 × 0b | STPGNT | Stop Grant |
| 0 × 0d | SMIACK | SMI Acknowledge |
| 0 × 0f | DRAIN | Accelerate replies |
| 0 × 10 | LOCKON | System Lock (reply needed) |
| 0 × 12 | LOCKOFF | System Unlock (reply needed) |
| 0 × 14 | MB | Memory Barrier (reply needed) |
| 0 × 17 | MC | Machine Check |
| 0 × 18 | DRAINW | Complete all writes then reply (reply needed) (BBU->FCU: AGP Flush) |
| 0 × 1a | BOUND | transactions after this cannot pass preceding transactions (reply needed) (BBU->FCU: AGP Fence) |
| 0 × 82 | IDENTC | CCU Ident (reply needed) |
| 0 × 84 | IDENTB | BBU Ident (reply needed) |
| 0 × 86 | IDENTM | MCU Ident (reply needed) Uses ADDR field overloading encoded as shown elsewhere |
| 0 × 90 | AVAIL | Resource Availability (reply needed)<br>ADDR encoded as:<br>38:27 reserved<br>26:21 request cmd buffer count<br>20:15 reply cmd buffer count<br>14:9 request data buffer count<br>8:3 reply data buffer count<br>Data buffers can hold up to a cache line's worth of data. If a value in the corresponding SOP IDENTx was zero, the SOP AVAIL value should be zero and will be ignored. If a request value is zero in the SOP IDENTx, the reply value covers both types. |
| 0 × F1 | RESUMEA | Resume Address BackedOff Requests |
| 0 × F3 | RESUMEG | Resume GART Backed Off Requests. Only those SOPs with the low order BE bit off (ie: those that are even) get a reply. |

"ADDR" Field Overloading for SOP/IDENT/MCU Identification Sub-table:

| Addr Bit(s) | Function | Value |
|---|---|---|
| 38 | compatibility PCI bus | |
| 37 | SCID control: | |
| | 0 | independent |
| | 1 | QID extension (all SCID order must be same) |
| 36:35 | reserved | |
| 34:33 | SCID0 ordering | |
| | If IDENTC = | |
| | 00 | K7 |
| | 01 | Alpha |
| | 10 | Pentium |
| | 11 | reserved |
| | If IDENTB = | |
| | 00 | strong (PCI) |
| | 01 | athletic (AGP) |
| | 10 | weak (no order) |
| | 11 | reserved |
| | if IDENTM = | |
| | 00 | always |
| 32:31 | SCID1 ordering | |
| 30:29 | SCID2 ordering | |
| 28:27 | SCID3 ordering | |
| 26:21 | cmd request buffer count | |
| 20:15 | cmd reply buffer count | |
| 14:9 | request data buffer counts | |

-continued

| Addr Bit(s) | Function | Value |
|---|---|---|
| 8:3 | reply data buffer counts | Data buffers can hold up to a cache line's worth of data. If a request value is zero, the reply value covers both types. If both request and reply values are zero, no resource control takes place (the SOP AVAIL protocol is ignored for that resource type). If all four counts are zero no SOP AVAILs are needed.<br>SOP requests give chip values<br>SOP replies give FCU values<br>SOP requests use CID = 0<br>SOP replies have actual CID |

"BE" Field Encoding of SCID/QID for Cache Operation (COP) Overloading Case Sub-table:

Format: DCCxxNTS where
D = Direction
0 from processor to FCU
1 from FCU to processor
CC = Command-see below
xx-Reserved
NTS field must encode the I value DCC-Direction and command as follows:

| | | |
|---|---|---|
| 000 | STC2M-processor E/S -> M request | NTS must encode N value |
| 001 | E2M-processor E -> M request | NTS must encode N value |
| 010 | S2 -processor S -> M request | NTS must encode N value |
| 011 | INVD-processor * -> I notice | NTS must encode N value |
| 100 | CCS-Change cache state (No Operation) | NTS is new cache line state |
| 101 | CWR-send cache line as write request | NTS is new cache line state |
| 110 | CRD-send cache line as read reply | NTS is new cache line state |
| 111 | CEV-send cache line as write request | (used to evict lines in tag-sectoring) |

NTS

| | |
|---|---|
| 000 | S-shared |
| 001 | E-exclusive |
| 010 | O-owner |
| 011 | M-modified |
| 100 | I-invalid |
| 101 | reserved |
| 110 | reserved |
| 111 | N-no change |

Note: The reply for any of the read commands may have changed the CMD field to encode what the cache state of the line should be (ie: a RDE request may generate a RDE reply if the line is in exclusive state or a RDS reply if the line is in shared state).

Replies for SOP/CWR and SOP/CEV may have D=1 and LEN=<cl> In this case data cycles follow the reply. The BE field is used for different purposes, so it is assumed to be 0xff. This type of SOP reply will be converted internally to a WRB.

Data Flag (D) table

| [58] | Description |
|---|---|
| 0 | No data cycles follow this command header |
| 1 | At least one data cycle follows command header<br>Note 1: Must look at LEN and BE fields to determine how many<br>Note 2: D = 1 must never happen with TY = EP |

Comand Type (TY) Table

| [57:56] | TY | Type |
|---|---|---|
| 00 | RQ | Request |
| 01 | HQ | Hi-Priority request |
| 10 | RP | Reply |
| 11 | EP | Error Reply |

Byte Enable Field (BE): For reads or writes, this encodes which of eight sub-blocks of the data transmitted is actually valid. Each bit of the BE field will be a one if the corresponding eighth of the LEN field is valid. The high order bit of the BE field corresponds to the higher addressed eighth of the transmitted data. The corresponding data is the logical (linear) data order after any data wrapping based on ADDR [5:3] is taken into account. For Special Operation (SOP) or Cache Operation (COP) commands, the BE field encodes a sub-command.

Length Field (LEN) Table

| [47:46] | Length |
|---|---|
| 00 | 8 bytes (one data cycle) |
| 01 | 32 bytes (four data cycles) |
| 10 | 64 bytes (eight data cycles) |
| 11 | 512 bytes (sixty-four data cycles) |

The LEN field specifies the length of request for read or write commands. The field must always be set to 00 for other types of commands.

Channel Identifier (CID) Table

| [45:42] | unit |
|---|---|
| 0000 | CCU 0 |
| 0001 | CCU 1 |
| 0010 | CCU 2 |
| 0011 | CCU 3 |
| 0100 | CCU 4 |
| 0101 | CCU 5 |
| 0110 | CCU 6 |
| 0111 | CCU 7 |
| 1000 | BBU 0 |
| 1001 | BBU 1 |
| 1010 | Reserved |
| 1011 | Reserved |
| 1100 | MCU 0 |
| 1101 | MCU 1 |
| 1110 | MCU 2 |
| 1111 | MCU 3 |

The CID field specifies which unit made the command request. Replies or Errors are returned to this unit. The above encodings of the CID field are representative, but not mandatory. An implementation might allow replacement of a CCU with additional BBUs, for example.

Sub-Channel Identifier

41:40 SCID Sub-Channel Identifier

Each channel identifier may have a variety of devices associated with it. Any replies or errors must preserve the SCID value that was part of the request. The value is implementation specific within each unit. For BBUs, one SCID would be PCI bus 0 and another would be AGP bus 0 or PCI bus 1. For CCUs, the SCID might be used to extend the QID field by two more bits.

Queue Identifier

39:36 QID Queue Identifier

Each component that makes requests assigns a QID to the request. Any replies or errors must preserve the QID value that was part of the request.

Address Field

35:32 ADDR[38:35]

31:0 ADDR[34:3]

Address Bits:

ADDR[38] == 0 means I/O address space

ADDR[38] == 1 means memory address space

For the S2000-K7 which has PA[34:3], the following mapping occurs:

PA[34] --> ADDR[38]

0000 --> ADDR[37:34]

PA[33:3] --> ADDR[33:3]

For the EV6-Alpha which has PA[42:3], the following mapping occurs:

PA[42] --> ADDR[38] (xored)

PA[37:3] --> ADDR[37:3]

PA[41:38] must be zero

For memory addresses going to an MCU, the FCU will remove the address bits that select which MCU port and which MCU, and shift down all higher order bits except for ADDR[38]. ADDR[37] will be set to the port number for the MCU (which may be in single channel mode).

Replies are constructed from the request header with the TY field changed. Replies should be matched with requests by using the CID, SCID, and QID field. Replies may not have the same ADDR fields as the request. COP replies may not have the same BE field as the request. Any initiator needing the ADDR field or BE field of a COP for processing a reply must retain this information and match it based on the CID, SCID, and QID of the reply.

Bits [5:3] of the ADDR field in replies still indicates to the initiator the order that different quadwords are being returned in. Targets must maintain the value of ADDR[5:3] in replies so that they correspond to the order that quadwords (64 bit values) are returned.

Command Mappings. In the following, <cl> indicates the current cache line length, either 64 in K7 or Alpha mode, or 32 in Pentium mode.

Mapping between S2K SysAddIn Commands and Channel Requests Table:

| S2K SysAddIn Command | Channel Request |
| --- | --- |
| (Probe Request) | (special processing) |
| NOP | (ignored) |
| ReadDataError | RD*, TY=EP |
| ChangeToDirtySuccess | COP/*M, TY=RP |
| ChangeToDirtyFail | COP/*M, TY=EP |
| ReleaseBuffer | (handled internal to CCU) |
| WriteData | (handled internal to CCU) |
| ReadData | RD*, TY=RP |
| ReadDataDirty | RDM, TY=RP |
| ReadDataShared | RDE or RDS, TY=RP |
| MBDone (Alpha) | SOP/MB, TY=RP |

Mapping between S2K SysAddOut Commands and Channel Requests Table:

| S2K SysAddOut Command | Channel Request |
| --- | --- |
| NOP | (ignored) |
| ProbeResponse | (special processing) |
| NZNOP | (ignored) |
| VDBFlushRequest | SOP/DRAIN |
| WrVictimBlk | WRB, LEN=<cl>, BE = 0 × ff |
| CleanVictimBlk | WRB, LEN=<cl>, BE = 0 × 00 |
| Evict | COP/INVD |
| LockToggle | SOP/LOCKON or SOP/LOCKOFF |
| RdByte | RDU, LEN = 8 |
| RdLW | RDU, LEN = 32 |
| RdQW | RDU, LEN = 64 |
| WrByte | WRC or WRU, LEN = 8 (WRU if ADDR[38]==0 or Alpha) |
| WrLW | WRC or WRU, LEN = 32 (WRU if ADDR[38]==0 or Alpha) |
| WrQW | WRC or WRU, LEN = 64 (WRU if ADDR[38]==0 or Alpha) |
| RdBlk | RDE, LEN=<cl>, BE = 0 × ff |
| RdBlkMod | RDM, LEN=<cl>, BE = 0 × ff |
| RdBlkI | RDS, LEN=<cl>, BE = 0 × ff |
| RdBlkU | RDC, LEN=<cl>, BE = 0 × ff |
| RdBlkSpec | (Spec commands treated as non-Spec versions) |
| RdBlkModSpec | (Spec commands treated as non-Spec versions) |
| RdBlkISpec | (Spec commands treated as non-Spec versions) |
| RdBlkUSpec | (Spec commands treated as non-Spec versions) |
| CleanToDirty | COP/E2M |
| SharedToDirty | COP/S2M |
| MB (Alpha) | SOP/MB |

-continued

| S2K SysAddOut Command | Channel Request |
|---|---|
| RdBlkVic (Alpha) | (Vic commands treated as non-Vic versions) |
| RdBlkModVic (Alpha) | (Vic commands treated as non-Vic versions) |
| RdBlkIVic (Alpha) | (Vic commands treated as non-Vic versions) |
| STCChangeToDirty (Alpha) | COP/STC2M |
| InvalToDirtyVic (Alpha) | (Vic commands treated as non-Vic versions) |
| InvalToDirty (Alpha) | RDM, LEN=<cl>, BE = 0 × 00 |

The Read* SysAddIn commands allow data to be returned in an arbitrary order. ReadData (100XX), ReadDataDirty (101XX), and ReadDataShared (110XX) must set XX from bits of the ADDR field. If the LEN field is 64, XX gets set from ADDR[5:4]; if the LEN field is <64, XX gets set from ADDR[4:3]. The WriteData (010XX) SysAddIn must always be encoded as 01000—as data is always obtained from the CPU in order.

Mapping between PCI Commands and Channel Requests Table:

| PCI Command | Channel Command | Channel Request |
|---|---|---|
| 0000 | Interrupt Ack | RDU in IACK space |
| 0001 | Special Cycle | SOP |
| 0010 | I/O Read | RDU, LEN=8, BE=... |
| 0011 | I/O Write | WRU, LEN=8, BE=... |
| 0100 | reserved | — |
| 0101 | reserved | — |
| 0110 | Memory Read | RDC |
| 0111 | Memory Write | WRC |
| 1000 | reserved | — |
| 1001 | reserved | — |
| 1010 | Configuration Read | RDU |
| 1011 | Configuration Write | WRU |
| 1100 | Memory Read Multiple | RDC |
| 1101 | Dual Address Cycle | (internal to BBU) |
| 1110 | Memory Read Line | RDC, LEN=<cl> |
| 1111 | Memory Write/Invalidate | WRC, LEN=<cl>, BE=0xff |

Mapping between AGP Commands and Channel Requests Table:

| AGP Command | Channel Command | Channel Request |
|---|---|---|
| 0000 | Read | RDU, LEN=64, BE=... |
| 0001 | Read (hi-priority) | RDU, LEN=64, TY=HQ, BE=... |
| 0010 | reserved | — |
| 0011 | reserved | — |
| 0100 | Write | WRU, LEN=64, BE=... |
| 0101 | Write (hi-priority) | WRU, LEN=64, TY=HQ, BE=... |
| 0110 | reserved | — |
| 0111 | reserved | — |
| 1000 | Long Read | RDU, LEN=64, BE=... |
| 1001 | Long Read (hi-priority) | RDU, LEN=64, TY=HQ, BE=... |
| 1010 | Flush | SOP/DRAINW |
| 1011 | reserved | — |
| 1100 | Fence | SOP/BOUND |
| 1101 | Dual Address Cycle | (internal to BBU) |
| 1110 | reserved | — |
| 1111 | reserved | — |

Conclusion

Although the present invention has been described using particular illustrative embodiments, it will be understood that many variations in construction, arrangement and use are possible within the scope of the invention. For example the number of units, banks, ways, or arrays, and the size or width, number of entries, number of ports, speed, and type of technology used may generally be varied in each component block of the invention. Functionally equivalent techniques known to those skilled in the art may be employed instead of those illustrated to implement various components. The names given to interconnect and logic are illustrative, and should not be construed as limiting the invention. The present invention is thus to be construed as including all possible modifications and variations encompassed within the scope of the appended claims.

We claim:

1. A shared-memory multi-processor system comprising:
   a switch fabric configured to switch packets containing data;
   a plurality of channels configured to transfer the packets;
   a plurality of switch interfaces configured to exchange the packets with the switch fabric, exchange the packets over the channels, and perform error correction of the data in the packets exchanged over the channels;
   a plurality of microprocessor interfaces configured to exchange the data with a plurality of microprocessors, exchange the packets with the switch interfaces over the channels, and perform error correction of the data in the packets exchanged over the channels; and
   a memory interface configured to exchange the data with a memory device, exchange the packets with the switch interfaces over the channels, and perform error correction of the data in the packets exchanged over the channels.

2. The shared-memory multi-processor system of claim 1 wherein the interfaces are configured to add error correction codes to the packets being transferred over the channels to check the error correction codes in the packets being received over the channels and to transfer a retry request if one of the packets being received has an error.

3. The shared-memory multi-processor system of claim 1 wherein the interfaces are configured to add sequence codes to the packets being transferred over the channels, to check the sequence codes in the packets being received over the channels, and to transfer a retry request if there is a sequence error.

4. The shared-memory multi-processor system of claim 1 wherein the interfaces are configured to recalibrate one of the channels after a number of retry failures over the one channel.

5. The shared-memory multi-processor system of claim 1 wherein all of the interfaces are configured to perform a synchronous reset.

6. The shared-memory multi-processor system of claim 1 wherein the interfaces are configured to transfer a backoff request to reduce packet transmission over one of the channels.

7. The shared-memory multi-processor system of claim 1 wherein the microprocessor interfaces are configured to operate based clocks in the microprocessors.

8. The shared-memory multi-processor system of claim 1 further comprising a bus interface configured to exchange the data with a bus, exchange the packets with the switch interfaces over the channels, and perform error correction of the data in the packets exchanged over the channels.

9. The shared-memory multi-processor system of claim 1 further comprising a transaction controller configured to maintain an order of data transactions between the microprocessors and the memory device based on a cache coherency protocol.

10. The shared-memory multi-processor system of claim 1 further comprising a transaction controller configured to maintain a duplicate set of cache tags for the microprocessors and maintain an order of cache tag updates for the microprocessors.

11. The shared-memory multi-processor system of claim 1 further comprising the microprocessors and the memory device.

12. The shared-memory multi-processor system of claim 1 wherein the channels each comprise a point-to-point connection between a pair of the interfaces.

13. A shared-memory multi-processor system comprising:
   a switch fabric means for switching packets containing data;
   a channel means for transferring the packets;
   a switch interface means for exchanging the packets with the switch fabric means, exchanging the packets over the channel means, and performing error correction of the data in the packets exchanged over the channel means;
   a microprocessor interface means for exchanging the data with a plurality of microprocessors, exchanging the packets with the switch interface means over the channel means, and performing error correction of the data in the packets exchanged over the channel means; and
   a memory interface means for exchanging the data with a memory device, exchanging the packets with the switch interface means over the channel means, and performing error correction of the data in the packets exchanged over the channel means.

14. The shared-memory multi-processor system of claim 13 wherein the interface means are for adding error correction codes to the packets being transferred over the channel means, checking the error correction codes in the packets being received over the channel means, and transferring a retry request if one of the packets being received has an error.

15. The shared-memory multi-processor system of claim 13 wherein the interface means are for adding sequence codes to the packets being transferred over the channel means, checking the sequence codes in the packets being received over the channel means, and transferring a retry request if there is a sequence error.

16. The shared-memory multi-processor system of claim 13 wherein the interface means are for recalibrating the channel means after a number of retry failures.

17. The shared-memory multi-processor system of claim 13 wherein the interface means are for performing a synchronous reset.

18. The shared-memory multi-processor system of claim 13 wherein the interface means are for transferring a backoff request to reduce packet transmission over the channel means.

19. The shared-memory multi-processor system of claim 13 wherein the microprocessor interface means are for operating based clocks in the microprocessors.

20. The shared-memory multi-processor system of claim 13 further comprising a bus interface means for exchanging the data with a bus, exchanging the packets with the switch interface means over the channel means, and performing error correction of the data in the packets exchanged over the channel means.

21. The shared-memory multi-processor system of claim 13 further comprising a transaction controller means for maintaining an order of data transactions between the microprocessors and the memory device based on a cache coherency protocol.

22. The shared-memory multi-processor system of claim 13 further comprising a transaction controller means for maintaining a duplicate set of cache tags for the microprocessors and maintaining an order of cache tag updates for the microprocessors.

23. The shared-memory multi-processor system of claim 13 further comprising the microprocessors and the memory device.

24. A method of operating a shared-memory multi-processor system, the method comprising:
   exchanging data between a plurality of microprocessors and a plurality of microprocessor interfaces;
   exchanging packets containing the data between the microprocessor interfaces and a plurality of switch interfaces over channels;
   exchanging the packets between the switch interfaces through a switch fabric;
   exchanging the packets between the switch interfaces and a memory interface over the channels;
   exchanging the data between the memory interface and a memory device; and
   in the interfaces, performing error correction of the data in the packets exchanged over the channels.

25. The method of claim 24 wherein performing error correction of the data in the packets exchanged over the channels comprises:
   adding error correction codes to the packets being transferred over the channels;
   checking the error correction codes in the packets being received over the channels; and
   transferring a retry request if one of the packets being received has an error.

26. The method of claim 24 wherein performing error correction of the data in the packets exchanged over the channels comprises:
   adding sequence codes to the packets being transferred over the channels;
   checking the sequence codes in the packets being received over the channels; and
   transferring a retry request if there is a sequence error.

27. The method of claim 24 comprising recalibrating one of the channels after a number of retry failures over the one channel.

28. The method of claim 24 comprising performing a synchronous reset of one of the channels.

29. The method of claim 24 comprising transferring a backoff request to reduce packet transmission over one of the channels.

30. The method of claim 24 comprising operating the microprocessor interfaces based on clocks in the microprocessors.

31. The method of claim 24 further comprising:
exchanging the packets between the switch interfaces and a bus interface over the channels; and
exchanging the data between the bus interface and a bus.

32. The method of claim 24 further comprising maintaining an order of data transactions between the microprocessors and the memory device based on a cache coherency protocol.

33. The method of claim 24 further comprising:
maintaining a duplicate set of cache tags for the microprocessors; and
maintaining an order of cache tag updates for the microprocessors.

34. The method of claim 24 wherein the channels each comprise a point-to-point connection between a pair of the interfaces.

35. A system for transporting information comprising:
a switched fabric including a single system-serialization point;
a transaction initiator having a cache memory, wherein said transaction initiator is coupled to said switched fabric via a point-to-point connection;
a first channel interface, situated between said transaction initiator and said point-to-point connection;
a second channel interface, situated between said point-to-point connection and said switched fabric, wherein said first and second channel interfaces transport packets across said point-to-point connection according to a channel protocol to perform error correction of data in said packets; and
a transaction controller to monitor said packets passing through said system-serialization point and to maintain the coherency of said cache memory.

36. The system of claim 35 wherein said transaction initiator includes core logic that operates according to a first clock, said packets include an error correction code, said first channel interface checks said error correction code within one cycle of said first clock after receiving a first packet from said second channel interface to determine whether an error has occurred, and if so, notifies said second channel interface to re-send said first packet.

37. The system of claim 36 wherein said channel protocol specifies the number of times said first channel interface will notify said second channel interface to re-send said first packet before re-calibrating said point-to-point connection.

38. The system of claim 36 wherein said first channel interface sends said first packet to said core logic before completing said check of the error correction code, and if an error is found, notifies said core logic that said first packet is invalid.

39. The system of claim 35 wherein said first and second channel interfaces exchange flow control information.

40. The system of claim 39 wherein said flow control information comprises a command to cease sending packets containing data.

41. The system of claim 35 wherein said transaction initiator includes core logic that provides a transaction-level layer of said channel protocol, and wherein said first and second channel interfaces include channel interface logic that provides a link-level layer of said channel protocol and a transceiver that provides a physical layer of said channel protocol.

42. A system for transporting information comprising:
a switched fabric including a single system-serialization point;
a first processor having a cache memory, wherein said processor is coupled to said switched fabric via a first point-to-point connection;
a first channel interface, situated between said processor and said first point-to-point connection, and a second channel interface, situated between said first point-to-point connection and said switched fabric, wherein said first and second channel interfaces transport packets across said first point-to-point connection according to a channel protocol to perform error correction of data in said packets;
a system memory coupled to said switched fabric via a second point-to-point connection;
a third channel interface, situated between said system memory and said second point-to-point connection, and a fourth channel interface, situated between said second point-to-point connection and said switched fabric, wherein said third and fourth channel interfaces transport packets across said second point-to-point connection according to said channel protocol to perform error correction of data in said packets; and
a transaction controller to monitor said packets passing through said system-serialization point and to maintain the coherency of said cache memory.

43. The system of claim 42 wherein said first, second, third, and fourth channel interfaces present a common interface.

44. The system of claim 42 further comprising:
an input/output (I/O) device coupled to said switched fabric via a third point-to-point connection; and
a fifth channel interface, situated between said I/O device and said third point-to-point connection, and a sixth channel interface, situated between said third point-to-point connection and said switched fabric, wherein said fifth and sixth channel interfaces transport packets across said third point-to-point connection according to said channel protocol to perform error correction of data in said packets.

* * * * *

UNITED STATES PATENT AND TRADEMARK OFFICE
CERTIFICATE OF CORRECTION

PATENT NO.     : 6,516,442 B1                                             Page 1 of 1
DATED          : February 4, 2003
INVENTOR(S)    : Yuanlong Wang et al.

It is certified that error appears in the above-identified patent and that said Letters Patent is hereby corrected as shown below:

<u>Title page,</u>
Item [75], please replace Item [75] with the following:
-- [75] Inventors: Yuanlong Wang, San Jose, CA (US); Brian R. Baird, Alameda County, CA (US); Daniel Fu, Sunnyvale, CA (US); Earl T. Cohen, Fremont, CA (US); Carlton G. Amdahl, Alameda County, CA (US) --

Signed and Sealed this

Second Day of September, 2003

JAMES E. ROGAN
*Director of the United States Patent and Trademark Office*